(12) United States Patent
Weinraub

(10) Patent No.: US 11,849,158 B2
(45) Date of Patent: Dec. 19, 2023

(54) SYSTEMS AND METHODS FOR FACILITATING ADAPTIVE CONTENT SPLICING

(71) Applicant: DISH Technologies L.L.C., Englewood, CO (US)

(72) Inventor: Mitchell Weinraub, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 17/750,689

(22) Filed: May 23, 2022

(65) Prior Publication Data

US 2022/0286719 A1 Sep. 8, 2022

Related U.S. Application Data

(63) Continuation of application No. 16/911,739, filed on Jun. 25, 2020, now Pat. No. 11,368,727, which is a continuation of application No. 16/264,644, filed on Jan. 31, 2019, now Pat. No. 10,743,041.

(51) Int. Cl.
*H04N 21/234* (2011.01)
*H04N 21/258* (2011.01)

(52) U.S. Cl.
CPC ............ *H04N 21/23424* (2013.01); *H04N 21/23418* (2013.01); *H04N 21/25841* (2013.01)

(58) Field of Classification Search
CPC .............................................. H04N 21/23424
See application file for complete search history.

(56) References Cited

U.S. PATENT DOCUMENTS

| | | |
|---|---|---|
| 5,559,549 A | 9/1996 | Hendricks |
| 5,754,651 A | 5/1998 | Blatter et al. |
| 6,219,358 B1 | 4/2001 | Pinder et al. |
| 6,240,555 B1 | 5/2001 | Shoff et al. |
| 6,453,304 B1 | 9/2002 | Manabu et al. |
| 7,079,176 B1 | 7/2006 | Freeman et al. |
| 7,242,406 B2 | 7/2007 | Robotham et al. |
| 8,046,798 B1 | 10/2011 | Schlack et al. |
| 8,190,674 B2 | 5/2012 | Narayanan et al. |

(Continued)

OTHER PUBLICATIONS

European Search Report for EP 20154863 dated Jun. 19, 2020, 10 pages.

*Primary Examiner* — Michael H Hong
(74) *Attorney, Agent, or Firm* — KILPATRICK TOWNSEND & STOCKTON LLP

(57) ABSTRACT

Systems, methods, and machine-readable media for adaptive content splicing with respect to content corresponding to a televised event are disclosed. First content may be received and may be determined to correspond to an event that is televised. One or more indicators of one or more state changes with respect to the event may be detected. A content composite may be created. An adaptable content item received from a first system may be processed. A content object re may be processed. The adaptable content item may be modified based at least in part on the content object to form the content composite. The creating the content composite may be a function of rules mapped to a current geolocation. Second content corresponding to the programming content may be received. The second content may be output for display in conjunction with the content composite.

20 Claims, 8 Drawing Sheets

(56) References Cited

U.S. PATENT DOCUMENTS

| | | | |
|---|---|---|---|
| 8,355,450 B1 | 1/2013 | Eshet et al. | |
| 8,667,527 B2 | 3/2014 | Yan et al. | |
| 8,855,681 B1 | 10/2014 | George et al. | |
| 8,918,636 B2 | 12/2014 | Kiefer et al. | |
| 9,104,661 B1 | 8/2015 | Evans | |
| 9,225,939 B1 * | 12/2015 | Kidd | H04N 21/25875 |
| 9,848,228 B1 | 12/2017 | Morris et al. | |
| 9,848,249 B2 | 12/2017 | Freed et al. | |
| 9,918,134 B2 | 3/2018 | O'Hanlon | |
| 9,948,966 B1 | 4/2018 | Panchaksharaiah et al. | |
| 10,880,351 B1 | 12/2020 | Estus et al. | |
| 10,951,958 B1 | 3/2021 | Arana et al. | |
| 11,303,943 B2 | 4/2022 | Carney Landow | |
| 2002/0090198 A1 | 7/2002 | Rosenberg et al. | |
| 2003/0105637 A1 | 6/2003 | Rodriguez et al. | |
| 2006/0089870 A1 | 4/2006 | Myhr | |
| 2007/0172196 A1 | 7/2007 | Kusunoki et al. | |
| 2007/0263860 A1 | 11/2007 | Buchen et al. | |
| 2007/0300265 A1 | 12/2007 | Karkkainen et al. | |
| 2008/0109307 A1 | 5/2008 | Ullah | |
| 2008/0195457 A1 | 8/2008 | Sherman et al. | |
| 2008/0300982 A1 | 12/2008 | Larson et al. | |
| 2008/0301732 A1 | 12/2008 | Archer et al. | |
| 2008/0316358 A1 | 12/2008 | Beadle et al. | |
| 2009/0044217 A1 | 2/2009 | Lutterbach et al. | |
| 2009/0193126 A1 | 7/2009 | Agarwal et al. | |
| 2010/0023963 A1 | 1/2010 | Crookes et al. | |
| 2010/0153983 A1 | 6/2010 | Philmon et al. | |
| 2010/0179867 A1 | 7/2010 | Hughes et al. | |
| 2011/0067099 A1 | 3/2011 | Barton et al. | |
| 2011/0179445 A1 | 7/2011 | Brown et al. | |
| 2011/0246495 A1 | 10/2011 | Mallinson | |
| 2012/0052941 A1 | 3/2012 | Mo | |
| 2012/0254456 A1 | 10/2012 | Visharam et al. | |
| 2012/0272279 A1 | 10/2012 | Lim et al. | |
| 2013/0166452 A1 | 6/2013 | Song et al. | |
| 2013/0174196 A1 | 7/2013 | Herlein | |
| 2013/0326024 A1 | 12/2013 | Chen | |
| 2014/0101118 A1 | 4/2014 | Dhanapal | |
| 2014/0133695 A1 | 5/2014 | Lienhart et al. | |
| 2014/0247931 A1 | 9/2014 | Swamy et al. | |
| 2014/0351045 A1 | 11/2014 | Abihssira et al. | |
| 2015/0002749 A1 | 1/2015 | Ishizuka et al. | |
| 2015/0020097 A1 | 1/2015 | Freed et al. | |
| 2015/0287285 A1 * | 10/2015 | Shore | G07F 17/3223 463/25 |
| 2017/0118263 A1 | 4/2017 | Crabtree et al. | |
| 2017/0208369 A1 | 7/2017 | Major et al. | |
| 2017/0295503 A1 | 10/2017 | Govindaraju et al. | |
| 2018/0088895 A1 | 3/2018 | Pedersen et al. | |
| 2018/0124438 A1 * | 5/2018 | Barnett | H04N 21/4826 |
| 2018/0139507 A1 | 5/2018 | Toksoz et al. | |
| 2018/0220201 A1 | 8/2018 | Stoksik et al. | |
| 2018/0279002 A1 | 9/2018 | Cugi et al. | |
| 2018/0295134 A1 | 10/2018 | Gupta et al. | |
| 2018/0324473 A1 | 11/2018 | Sharma | |
| 2019/0141367 A1 | 5/2019 | Loheide et al. | |
| 2019/0164209 A1 | 5/2019 | Park | |
| 2019/0306549 A1 | 10/2019 | Dietz et al. | |
| 2019/0354943 A1 | 11/2019 | Mulye et al. | |
| 2020/0005388 A1 | 1/2020 | Lim et al. | |
| 2021/0120289 A1 | 4/2021 | Carney Landow | |
| 2022/0095001 A1 | 3/2022 | Harvianinen | |

* cited by examiner

SYSTEMS AND METHODS FOR FACILITATING ADAPTIVE CONTENT SPLICING

CROSS-REFERENCES TO RELATED APPLICATIONS

This application is a continuation of U.S. application Ser. No. 16/911,739, filed Jun. 25, 2020, which is a continuation of U.S. application Ser. No. 16/264,644, filed Jan. 31, 2019, issued as U.S. Pat. No. 10,743,041. The entire disclosures of both of the aforementioned U.S. Patent Applications are hereby incorporated by reference, for all purposes, as if fully set forth herein

TECHNICAL FIELD

This disclosure generally relates to television content handling, and more particularly to systems and methods for facilitating adaptive content splicing.

BACKGROUND

Users of televisions and other video distribution platforms are now exposed to more varying types of content than ever before. However, with the proliferation of different content, a viewer can encounter a number of difficulties. Chief among the difficulties is the amount of time and effort necessary to search for and interact with various entities providing service offerings related to events viewed via the platforms. The options can be overwhelming to many users, and the process of locating service offerings of interest can be difficult and inefficient. Viewers are in need of better viewer experiences and more tailored service offerings.

Thus, there is a need for systems and methods that address the foregoing problems in order to provide viewers with better, more tailored viewer experiences. This and other needs are addressed by the present disclosure.

BRIEF SUMMARY

Certain embodiments of the present disclosure relate generally to television content handling, and more particularly to systems and methods for facilitating adaptive content splicing.

In one aspect, methods for adaptive content splicing with respect to content corresponding to a televised event are disclosed. The method may include one or a combination of the following. An electronic communication from a user interface may be received by a media device. The electronic communication may correspond to an indicator of programming content. First content corresponding to the programming content may be received by the media device and output for display. The media device may determine that the first content corresponds to an event that is televised. One or more indicators of one or more state changes with respect to the event may be detected. The one or more state changes may include a change occurring within the event. Consequent to the detecting the one or more state changes, a content composite for display in conjunction with the televised event may be created at least in part by one or more of the following. An adaptable content item received by the media device from a first system that is remote from the media device may be processed. A content object received by the media device via a network may be processed. The adaptable content item may be modified based at least in part on the content object to form the content composite. The creating the content composite may be a function of a current geolocation of the media device and a set of rules mapped to the current geolocation. Second content corresponding to the programming content may be received by the media device. The media device may output the second content for display in conjunction with the content composite.

In another aspect, media devices to facilitate adaptive content splicing with respect to content corresponding to a televised event are disclosed. The media devices may include one or more processors and a memory communicatively coupled with and readable by the one or more processors and having stored therein processor-readable instructions which, when executed by the one or more processors, cause the one or more processors to perform one or a combination of the following. An electronic communication received from a user interface may be processed. The electronic communication may correspond to an indicator of programming content. First content corresponding to the programming content may be received, processed, and output for display. The first content may be determined to correspond to an event that is televised. One or more indicators of one or more state changes with respect to the event may be detected. The one or more state changes may include a change occurring within the event. Consequent to the detecting the one or more state changes, a content composite for display in conjunction with the televised event may be created at least in part by one or more of the following. An adaptable content item received from a first system that is remote from the media device may be processed. A content object received via a network may be processed. The adaptable content item may be modified based at least in part on the content object to form the content composite. The creating the content composite may be a function of a current geolocation of the media device and a set of rules mapped to the current geolocation. Second content corresponding to the programming content may be received and processed. The second content may be output for display in conjunction with the content composite.

In yet another aspect, one or more non-transitory, machine-readable media are disclosed. The one or more non-transitory, machine-readable media may have machine-readable instructions thereon which, when executed by one or more processing devices, cause the one or more processing devices to perform one or a combination of the following. An electronic communication received from a user interface may be processed. The electronic communication may correspond to an indicator of programming content. First content corresponding to the programming content may be received, processed, and output for display. The first content may be determined to correspond to an event that is televised. One or more indicators of one or more state changes with respect to the event may be detected. The one or more state changes may include a change occurring within the event. Consequent to the detecting the one or more state changes, a content composite for display in conjunction with the televised event may be created at least in part by one or more of the following. An adaptable content item received from a first system that is remote from the one or more processing devices may be processed. A content object received via a network may be processed. The adaptable content item may be modified based at least in part on the content object to form the content composite. The creating the content composite may be a function of a current geolocation of the one or more processing devices and a set of rules mapped to the current geolocation. Second content corresponding to the programming content may be received and processed. The second content may be output for display in conjunction with the content composite.

In various embodiments of the above, the second content may correspond to a portion of the programming content that is directly before a break in the programming content, and the outputting the second content for display in conjunction with the content composite may include outputting the content composite during the break. In various embodiments of the above, the outputting the second content for display in conjunction with the content composite may include outputting the content composite for simultaneous presentation with presentation of the second content. In various embodiments of the above, the modifying the adaptable content item based at least in part on the content object may include augmenting the adaptable content item with at least a portion of the content object. In various embodiments of the above, the content object is received via the network from a second system that is different from the first system. In various embodiments of the above, the current geolocation may be determined at a time when the first content is being output for display. In various embodiments of the above, the detecting the one or more state changes with respect to the event may include detecting a break in the programming content that is upcoming within a time threshold.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
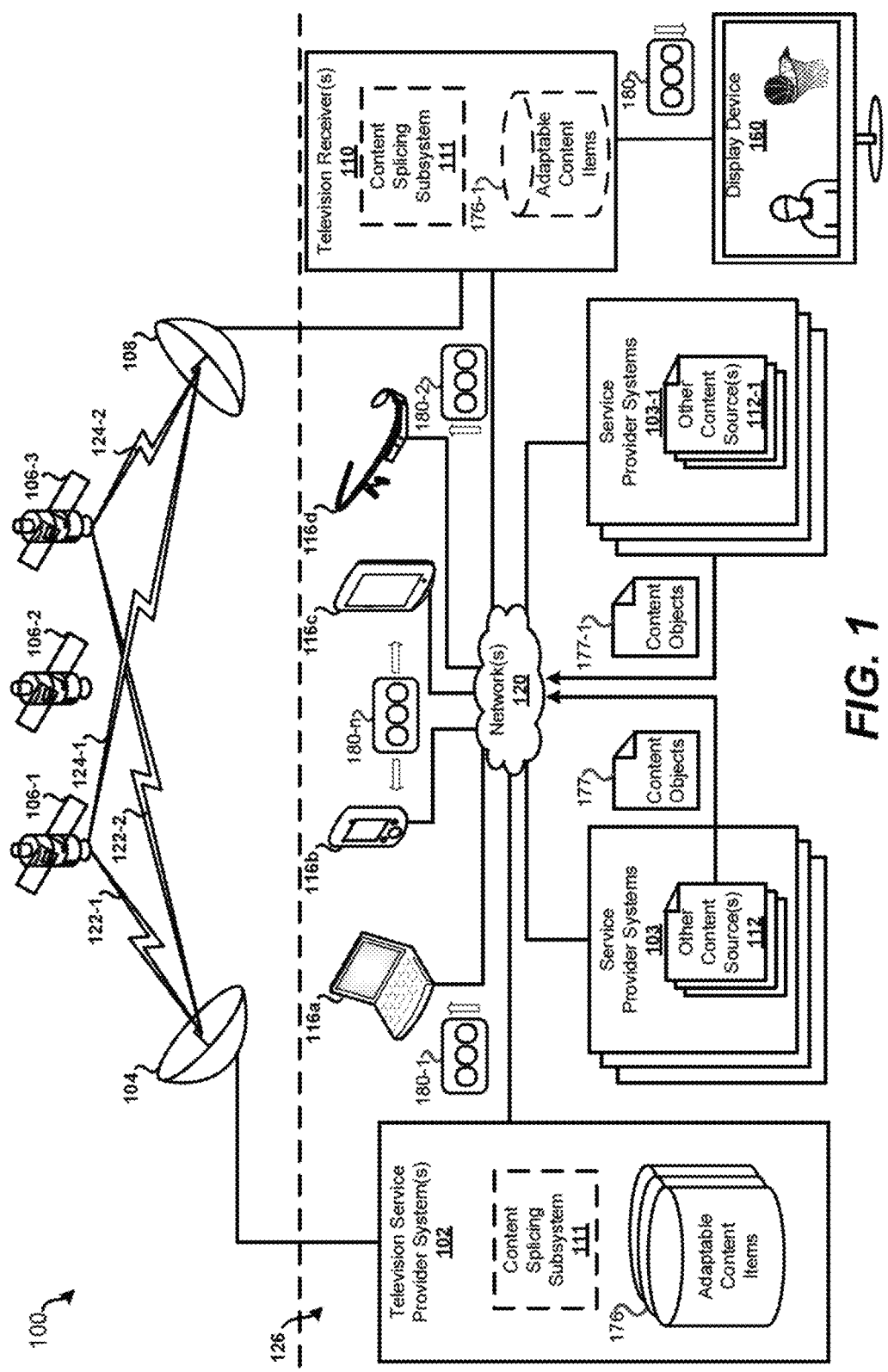
FIG. 1 illustrates a television programming distribution system, in accordance with disclosed embodiments of the present disclosure.

FIG. 1 illustrates a television program distribution system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The system 100 may include television service provider system 102, satellite uplink 104, a plurality of orbiting (e.g., geosynchronous) satellites 106, satellite receiver 108, one or more television receivers 110, one or more content sources 112 (e.g., online content sources), computing devices 116*a-d*, and service provider systems 103. In some embodiments, each of the television receivers 110 may include a content splicing subsystem 111. Additionally or alternatively, the television service provider 102 may include a content splicing subsystem 111 in whole or in part. Additionally or alternatively, one or more service provider systems 103 may include a content splicing subsystem 111 in whole or in part.

Additionally or alternatively, one or more computing devices 116 may include a content splicing subsystem 111 in whole or in part. The content splicing subsystem 111 may be configured to facilitate various content splicing features in accordance with various embodiments disclosed herein.

The television service provider 102 may include one or more adaptable content item repositories 176. The television service provider 102 may store adaptable content items in a repository 176. The one or more adaptable content item repositories 176 may be implemented in various ways. For example, one or more data processing systems may store adaptable content items. One or more relational or object-oriented databases, or flat files on one or more computers or networked storage devices, may store adaptable content items. In some embodiments, a centralized system stores adaptable content items; alternatively, a distributed/cloud system, network-based system, such as being implemented with a peer-to-peer network, or Internet, may store adaptable content items.

As disclosed herein, the content splicing subsystem 111 may be configured to perform one or more methods for adaptive content splicing with respect to content corresponding to a televised event. In various embodiments, part or all of the method may be performed while a receiver 110 and/or device 116 is receiving programming content and/or is outputting programming content for display. In various embodiments, part of the method may be performed in advance of the televised event and, thus, may be performed while is scheduled to output programming content but before the programming content is output for display. In various embodiments, one or more media devices (e.g., the receiver 110, device 116, and/or the system 102) may perform all or part of the method, with a single media device or multiple media devices performing the method.

A media device may receive and process an electronic communication from a user interface, the electronic communication corresponding to an indicator of programming content. For example, the indicator may correspond to a selection corresponding to a televised event, may correspond to an initialization/powering up of the receiver 110 and/or device 116, a channel and/or stream selection such as a selection to tune to a channel that is streaming the televised event or that is scheduled the stream the event, an application selection such as a selection to download or otherwise stream the televised event which may be by way of an application device, a selection to view and/or record a particular televised event, and/or the like.

The media device may receive content corresponding to the programming content and may output the content for display with a display device 160 and/or with a display component of a device 116. The content may be determined to correspond to a televised event as including the televised event, as preceding the televised event, and/or as being delivered within a temporal proximity to the televised event. This may include identifying one or more specifications of the televised event from the programming content; metadata associated with the programming content; EPG or other schedule data received by the receiver 110 and/or device 116 from the television service provider system 102 and mapping such data to the programming content, channel, and/or current or upcoming time/time period; and/or the like. Some embodiments may further include identifying the televised event as likely be viewed by a particular viewer based at least in part on viewer pattern data, even though the viewer has not yet made a selection to view and/or record the televised event. For example, as disclosed herein, the pattern data may indicate a preference for a particular type of event.

The subsystem 111 may determine that the televised event corresponds to the preference and that temporal specifications for the televised event satisfy one or more temporal thresholds. In some instances, the subsystem 111 may determine that the televised event is currently ongoing and available for viewing on another channel, stream, or other viewing options that the viewer has not yet selected. Likewise, in some instances, the subsystem 111 may determine that the televised event is scheduled to be available within a suitable time for threshold (e.g., a number of minutes, hours, days, weeks, and/or the like) for viewing on the same channel, stream, or other viewing option that the viewer has selected or on a different channel, stream, or other viewing option that the viewer has not yet selected.

One or more indicators of one or more state changes with respect to the event that is televised may be detected. The one or more state changes may include state changes occurring within the event, which may be real-time, real-world, and/or physical state changes such as those disclosed further herein. Further, the one or more state changes may include upcoming state changes such as commercial breaks, upcoming within a time threshold (e.g., a number of seconds and/or minutes).

Consequent to the detecting the one or more state changes, one or more content composites 180 may be created for display in conjunction with the televised event. A content composite 180 may be created at least in part by processing an adaptable content item 176 received by the media device from a first system, such the system 102; processing a content object 177 received by the media device from the system 102 or a different system 103; and modifying the adaptable content item 176 based at least in part on the content object 177 to form the content composite 180 as disclosed further herein. For example, the modifying the adaptable content item 176 based at least in part on the content object 177 may include augmenting the adaptable content item 176 with at least a portion of the content object 177.

Also as disclosed further herein, the creating the content composite 180 may be a function of a current geolocation of the media device and a set of rules mapped to the current geolocation. The current geolocation of the media device may be determined at a time when the first content is being output for display. With the content composite 180 created, second content corresponding to the programming content may be output for display in conjunction with the content composite 180. In some instances, the second content may corresponds to a portion of the programming content that is directly before a commercial break, and the outputting the second content for display in conjunction with the content composite 180 comprises outputting the content composite 180 during the commercial break. In other instances, the outputting the second content for display in conjunction with the content composite 180 comprises outputting the content composite 180 for simultaneous presentation with presentation of the second content.

Content items 176 and/or content item objects 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure. For example, the adaptable content items 176 may correspond to visual and/or audiovisual advertisements with graphical and/or audio components particularized to certain types of products and/or services. In some embodiments, the advertisements may correspond to commercials to be presented during commercial breaks of television programming, such as televised events. In some embodiments, the adaptable content items 176 may correspond to video and/or audio video file structures with one or more transition points, hooks, frames, windows, and/or the like for merging with one or more particularized content items, content objects 177, particularized to certain products and/or services. As disclosed herein, the adaptable content items 176 may be merged, blended, joined, overlaid, customized, and/or the like in any suitable manner with other particularized content objects 177 in order to create electronic content composites 180 particularized to certain types of products and/or services. In various embodiments, as further disclosed herein, the adaptable content items 176 and/or the other content objects 177 may be formatted, rescaled, cropped, image characteristic (e.g., color, brightness, transparency, opaqueness, contrast, etc.) adjusted, and/or otherwise prepared to facilitate the merging, blending, joining, overlaying, customizing, and/or the like and insertion into a content stream as disclosed further herein.

The television service provider 102 may provide the adaptable content items 176 and, in some embodiments, the particularized content objects 177, to the television receiver 110 as part of a data transfer that is sent through the satellite 106. For example, in some embodiments, the television receiver 110 may receive a downlinked satellite signal that includes the data for adaptable content items 176 and/or particularized content objects 177 transferred on a designated line in the vertical blanking interval (VBI) or other portion of the broadcast service transmission that does not interfere with other transmitted content. Additionally or alternatively, the television service provider 102 may provide adaptable content items 176 and/or particularized content objects 177 to the television receiver 110 via the one or more data networks 120. The television receiver 110 may store the adaptable content items 176 and/or particularized content objects 177 in an adaptable content item 176 repository and/or a particularized content objects 177 repository included in the television receiver 110 or otherwise local to the television receiver 110. Consequently, the television receiver 110 may use one or more of the adaptable content items 176 and one or more of the particularized content objects 177 to create electronic content composites 180 in accordance with embodiments disclosed herein. Additionally or alternatively to providing the adaptable content items 176 and/or particularized content objects 177, the television service provider 102 may provide content composites 180 to the television receiver 110 through such means.

The television service provider system 102 and satellite transmitter equipment (which may include the satellite uplink 104) may be operated by a television service provider. A television service provider may distribute television channels, on-demand programing, programming information, and/or other services to users via satellite. The television service provider system 102 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites in the form of transponder streams. Satellite transmitter equipment may be used to transmit a feed of one or more television channels from the television service provider system 102 to one or more satellites 106. While a single television service provider system 102 and satellite uplink 104 are illustrated as part of the television distribution system 100, it should be understood that multiple instances of transmitter equipment may be used, possibly scattered geographically to communicate with satellites 106. Such multiple instances of satellite transmitting equipment may communicate with the same or with different satellites 106.

System 100 may include one or more networks 120 that can be used for a bi-directional communication path for data transfer with television receivers 110 and other components of system 100. The network 120 is intended to represent any number of terrestrial and/or non-terrestrial networks and/or network features. For example, network 120 may incorporate or exhibit any number of features or elements of various wireless and/or hardwired packet-based communication networks such as, for example, a WAN (Wide Area Network) network (e.g., the Internet), a HAN (Home Area Network) network, a LAN (Local Area Network) network (e.g., a corporate LAN), a WLAN (Wireless Local Area Network) network, a cellular communications network, and/or any other type of communication network(s) configured such that data may be transferred between and among respective elements of the example system 100.

The television receivers 110, as described throughout, may generally be any type of television receiver (such as an STB (set-top box), for example) configured to decode signals received for output and presentation via a display device 160. In another example, television receiver 110 (which may include another remote television receiver 110) may be integrated as part of or into a television, a DVR, a computing device, such as a tablet computing device, or any other computing system or device, as well as variations thereof. In some embodiments, a television receiver 110 may be a component that is added into the display device 160, such as in the form of an expansion card. A television receiver 110 and network 120 together with television receivers 110 and/or one or more computing devices 116, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc. While only a limited number of television receivers 110, display devices 160, computing devices 116, etc. are illustrated in FIG. 1, it should be understood that multiple (e.g., tens, thousands, millions) instances of such equipment, corresponding to various users in various geolocations, may be included the system 100.

In some embodiments, broadcast television programs may be delivered to television receivers, including a television receiver 110, via satellite according to a schedule. On-demand content may also be delivered to a television receiver 110 via satellite. Satellites 106 may be configured to receive uplink signals 122 from satellite uplink 104. In this example, uplink signals 122 may contain one or more transponder streams of particular data or content, such as particular television channels, each of which may be supplied by television service provider 102. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first television channel and a second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

The satellites 106 may be further configured to relay uplink signals 122 to the satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth. The satellite receiver 108, which may include a satellite dish, a low noise block (LNB), and/or other components, may be provided for use to receive television channels, such as on a subscription basis, distributed by the television service provider 102 via the satellites 106. For example, the satellite receiver 108 may be configured to receive particular transponder streams as downlink signals 124, from one or more of the satellites 106. Based at least in part on the characteristics of a given television receiver 110 and/or satellite receiver 108, it may only be possible to capture transponder streams from a limited number of transponders of the satellites 106 concurrently. For example, a tuner of the television receiver 110 may only be able to tune to a single transponder stream from a transponder of a single satellite, such as the satellite 106-1, at a time.

The television receiver 110, which may be communicatively coupled to the satellite receiver 108, may subsequently select, via a tuner, decode, and relay television programming to a television for display thereon. Broadcast television programming or content may be presented "live," or from a recording as previously stored on, by, or at the television receiver 110. For example, an HD channel may be output to a television by the television receiver 110 in accordance with the HDMI/HDCP content protection technologies. Other embodiments are possible. For example, in some embodiments, an HD channel may be output to a television in accordance with the MoCA® (Multimedia over Coax Alliance) home entertainment networking standard. Other embodiments are possible.

The television receiver 110 may select via tuner, decode, and relay particular transponder streams to one or more of television receivers 110, which may in turn relay particular transponder streams to one or more display devices 160, 160-1. For example, the satellite receiver 108 and the television receiver 110 may, respectively, be configured to receive, decode, and relay at least one television channel to a television by way of a television receiver 110. Similar to the above-example, a television channel may generally be presented "live," or from a recording as previously stored by the television receiver 110, and may be output to the display device 160, 160-1 by way of the television receiver 110 in accordance with a particular content protection technology and/or networking standard. Other embodiments are possible.

In various embodiments, the content resources 126 may be used to provide the television receiver 110 with content (e.g., television programming). The content resources 126 may be used to retrieve television programs or portions of television programs following and/or during a live broadcast of the television programs. The content resources 126 may include the television service provider 102, the service provider systems 103, the online content sources 112, one or more other television receivers 110, and/or the like.

The television service provider 102, which may distribute broadcast television programming to the television receivers 110 via a satellite-based television programming distribution arrangement (or some other form of television programming distribution arrangement, such as a cable-based network or IP-based network, may use an alternate communication path, such as via the network 120, to provide television programming to the television receivers 110. The television receivers 110 may be permitted to request various television programs or portions of television programs from the television service provider 102 via the network 120. For instance, the television service provider 102 may be permitted to transmit a portion of a television program or an entire television program during and/or after a time at which the television program was broadcast live by the television service provider via a satellite-based television programming distribution arrangement.

In some embodiments, the television service provider 102 may provide a television program via on-demand content. On-demand content may be included in a user's subscription or may be provided on a per-request basis. Such on-demand content may be provided via the satellite-based distribution arrangement and/or via the network 120. If the on-demand version of the television program requires payment of a fee, before providing the television program to the television receiver 110, a user of the television receiver 110 may at least need to agree to payment of the fee. On-demand content provided via the satellite-based distribution arrangement may be stored locally by the television receiver 110 to allow on-demand access. On-demand content may also be retrieved via the network 120 from the television service provider 102.

The computing devices 116a-d represent various computerized devices that may be associated with a user of the television receiver 110 and that may be configured to facilitate various adaptive content features disclosed in various embodiments herein. As indicated by 116a, the computing devices 116a-d may include a laptop computer, a desktop computer, a home server, or another similar form of computerized device. As indicated by 116b and 116c, the computing devices 116a-d may include a cellular phone and/or smartphone, a tablet computer, or another similar form of mobile device. As indicated by 116d, the computing devices 116a-d may include smart glasses or another similar form of wearable computing device.

In various embodiments, the television receiver 110 may be provided with access credentials that allow access to content stored and/or accessible through one or more of the computing devices 116a-d. Likewise, in various embodiments, one or more of the computing devices 116a-d may be provided with access credentials that allow access to content stored and/or accessible through the television receiver 110 and/or account associated therewith and/or associated with an application installed on the one or more of the computing devices 116a-d. It should be understood that computing devices 116a-d are exemplary in nature. Content may be accessible through a lesser or greater number of computerized devices associated with a user of the television receiver 110.

In some embodiments, the online content sources 112 may represent content resources through which television programs may be retrieved by the television receiver 110 via the network 120. Television programming available through the online content sources 112 may be available for free and not require subscription (a username and/or password may or may not be necessary). Each of the online content sources 112 may represent different websites available via the Internet. For example, some television programming may be legally made available for free (such as television programming provided by government-funded sources, e.g., the BBC or Hulu®). Periodically, the television receiver 110 may poll online content sources 112 to determine which television programs are available and/or which television programs are scheduled to be available in the future. In some embodiments, the television receiver 110 may poll online content sources 112 regarding the availability of at least a portion of a specific television program.

The service provider systems 103 may correspond to one or more data sources 112 that are any suitable source of data to facilitate embodiments disclosed further herein. In various embodiments, the service provider systems 103 may include one or more computer systems, a database, a website, a portal, any repository of data in any suitable form, a server system, and/or the like. With some embodiments, the data sources 112 may include one or more mobile computing device locator services that provide information regarding the location of one or more computing devices 116a-d. With some embodiments, the data sources 112 may provide various details relating to IP addresses, cellular tower identification and location data, mobile device triangulation data, LAN identification data, Wi-Fi identification data, access point identification and location data, and/or the like data that facilitates location of one or more computing devices 116a-d. With some embodiments, the data sources 112 may provide demographic data about an area encompassing the location of one or more computing devices 116a-d.

In various embodiments, the data from the one or more data sources 112 may be retrieved and/or received by the television service provider system 102 and/or the subsystem(s) 111 via one or more data acquisition interfaces through network(s) 120 and/or through any other suitable means of transferring data. In various embodiments, the television service provider system 102 and/or the subsystem(s) 111 and the data sources 112 could use any suitable means for direct communication. In various embodiments, content objects 177 may be actively gathered and/or pulled from one or more data sources 112, for example, by accessing a repository and/or by "crawling" various repositories. Additionally or alternatively, the television service provider system 102 and/or the subsystem(s) 111 may wait for updates from one or a combination of the content source systems 112. Content objects 177 pulled and/or pushed from the one or more data sources 112 may be transformed, and the transformed content objects 177 and/or other data generated based thereon may be made available by the television service provider system 102 and/or the subsystem(s) 111 for use by the subsystem(s) 111 in creating content composites 180.

The one or more data acquisition interfaces may include one or more application programming interfaces (APIs) that define protocols and routines for interfacing with the data sources 112. The APIs may specify application programming interface (API) calls to/from service provider systems 103. In some embodiments, the APIs may include a plug-in to integrate with an application of a service provider system 103. The data acquisition interfaces, in some embodiments, could use a number of API translation profiles configured to allow interface with the one or more additional applications of the data sources to access data (e.g., a database or other data store) of the data sources 112. The API translation profiles may translate the protocols and routines of the service provider system 103 to integrate at least temporarily with the system and allow communication with the system by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

FIG. 1 illustrates an example of a satellite-based television channel distribution system. Again, it should be understood that at least some of the aspects of such a system may be similar to a cable television distribution system, an IPTV content distribution system, and/or any other type of media or content distribution system. For example, in a cable television system, rather than using satellite transponders, multiple RF channels on a cable may be used to transmit streams of television channels. As such, aspects detailed herein may be applicable to cable television distribution systems.

Further, the television server provider system 102 may include one or more content server systems configured to stream television programming, including televised events such as sports events, to the computing devices 116 via the network 120. When the streaming content servers stream content to the computing devices 116, the stream content may be processed and displayed by the computing devices 116 using one or more applications installed on the computing devices 116. Some such streaming services may require a subscription and may require user authentication, e.g., with a username and/or password which may or may not be associated with an account map to the television receiver 110. Accordingly, the streaming services may make a television program available for streaming or download during the live broadcast of the television program.

The television receiver 110 may be able to retrieve at least a portion of a television program through other television receivers 110, which can function as content resources. Similarly, the television receiver 110 may be able to cast at least a portion of a television program through other television receivers 110 and/or to computing devices 116. For instance, a Slingbox® (or other form of media streaming device) functioning in concert with a television receiver 110 may permit television programs to be captured and streamed over the network 120. In some embodiments, the television receivers 110 may have such media streaming capabilities integrated. In some embodiments, the television receivers 110 may cast programming content to the computing devices 116 via wireless signals. For example, the programming content from the television receiver 110 may be indirectly transmitted via a local network (e.g., via Wi-Fi) or directly transmitted to the computing device 116 via a casting device integrated with the television receiver 110 or coupled to the television receiver 110 (e.g., via a dongle). In some embodiments, the programming content may be cast to the computing device 116 via a wired connection (e.g., via one or more of HDMI, USB, lightning connector, etc.). Some embodiments of the television receivers 110 may provide for simulcasting such that the same programming that is being displayed on the display device 160 is being displayed on one or more of the computing devices 116 simultaneously or substantially simultaneously.

A user may be able to obtain at least a portion of a television program via the television receivers 110, which may be associated with other users or with the same user. For instance, the user may have multiple television receivers 110 at different locations. Periodically, the television receiver 110 may poll the other television receivers 110 to determine which television programs are available and/or which television programs are scheduled to be available in the future. In some embodiments, the television receiver 110 may poll the television receivers 110 regarding the availability of at least a portion of a specific television program.

Thus, while network configuration data may be broadcast repeatedly via satellite to television receivers 110, it should be understood that a similar arrangement may be used in cable-based television programming broadcast networks to broadcast network configuration. For any of the various type of network, various other forms of data may be transmitted via an Internet-based network 120 connection rather than using the television service provider's proprietary network. For instance, EPG data may be transmitted to television receivers via the network 120 (e.g., Internet) connection. As another example, firmware and/or software updates may be transmitted on demand to a television receiver via the Internet rather than the television receiver receiving the update via the television programming broadcast network.

Figure 2:
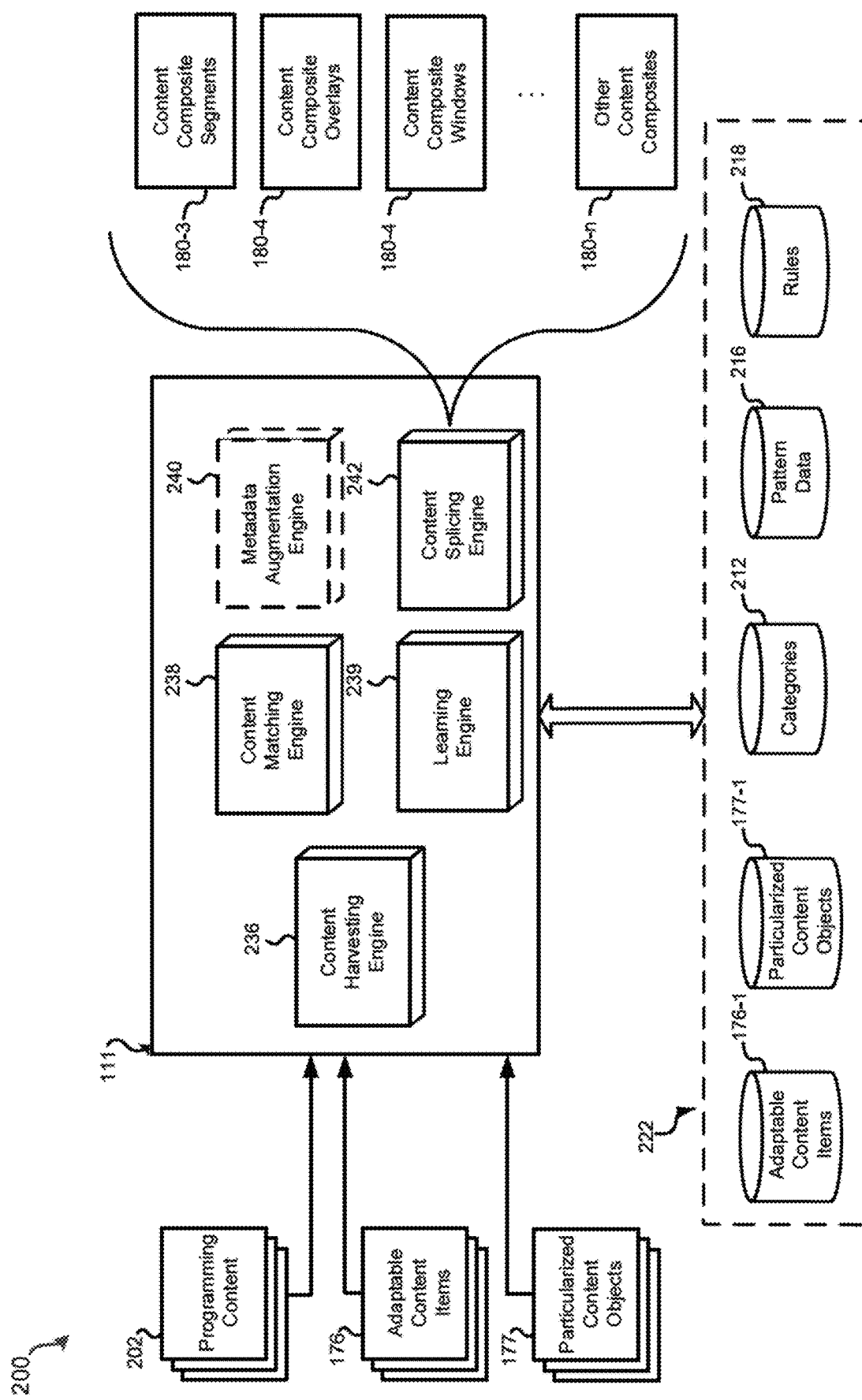
FIG. 2 illustrates a functional diagram of an adaptive content splicing system, in accordance with disclosed embodiments of the present disclosure.

FIG. 2 illustrates a functional diagram of an adaptive content splicing system 200, in accordance with disclosed embodiments of the present disclosure. In various embodiments, the content splicing system 200 may be included in the television service provider system 102 and/or the television receiver 110. In some embodiments, the content splicing system 200 may be separate from, and provide content to, the television service provider system 102. In some embodiments, the content splicing system 200 may be included in the end-user system and may be included in the television receiver 110 and/or one or more of the computing devices 116. In some embodiments, various features of the content splicing system 200 may be distributed between the television receiver 110 and upstream of the television receiver 110. Likewise, in some embodiments, various features of the content splicing system 200 may be distributed between one or more of the computing devices 116 and upstream of the one or more computing devices 116. While not all components of the adaptive content splicing system 200 are shown, the system 200 may include one or a combination of such components.

As depicted, the content splicing system 200 includes a content splicing subsystem 111. The content splicing subsystem 111 may include or otherwise correspond to an audiovisual control engine that, as with disclosed embodiments of the other engines, may include instructions retained in processor-readable media and to be executed by one or more processors. The content splicing subsystem 111 may be communicatively coupled with interface components and communication channels (e.g., of the television receiver 110 and/or the computing device 116, which may take various forms in various embodiments as disclosed herein) configured to receive programming content 202, which may correspond to televised sporting events, movies, television programs, portions thereof, etc. In various embodiments, the programming content 202 may include audiovisual content broadcast and/or otherwise transmitted by the television service provider 102 and/or one or more other service providers 103. The programming content 202 may include various components, including without limitation, one or more video tracks, audio tracks, audio video tracks, metadata tracks, close captioning information, and/or the like. In some embodiments, the content splicing system 200 may retain received programming content 202 in content storage 222. The content storage 222 may include any suitable form of storage media, such as any suitable form disclosed herein.

The content splicing subsystem 111 may be further configured to receive adaptable content items 176 and particularized content objects 177. The content splicing subsystem 111 may include a harvesting engine 236 configured to aggregate adaptable content items 176, particularized content objects 177, and/or programming content 202 in order to facilitate content splicing features disclosed herein. The content splicing subsystem 111 may include a matching engine 238, which, in various embodiments, may be configured to analyze, classify, categorize, characterize, tag, and/or annotate adaptable content items 176, particularized content objects 177, and/or programming content 202.

The content splicing subsystem 111 may include a content splicing engine 242. In some embodiments, the content splicing engine 242 may include a multiplexer. In various embodiments, the multiplexer may create a digital stream of data packets containing the video, audio, and, in some embodiments, the metadata to output the programming content 202, adaptable content items 176, and/or the composites 180 created with selected adaptable content items 176. In various embodiments, the content splicing engine 242 may be implemented at the receiver 110, the device 116, and/or the service provider system 102.

In embodiments where the content splicing engine 242 is implemented at the service provider system 102, the multiplexed data stream may be transmitted via the one or more networks 124 for provisioning to computing devices 116 or via a particular transponder stream via a transponder of a satellite four provisioning to receivers 110. The multiplexer may create a digital stream of data packets containing the video, audio, and entitlement control messages (ECMs), to be transmitted on the transponder data stream. The data stream, which includes video and/or audio data packets that are not scrambled, may be passed to a scrambling engine, which may use a control word to scramble video or audio present in a data packet. Some audio and video packets may also pass through with no scrambling, if desired by the television service provider 102. A control word generator may generate the control word that is used by a scrambling engine to scramble the video or audio present in the data packet. Control words generated by the control word generator may be passed to a security system, which may be operated by the television service provider or by a third-party security provider. The control words generated by control word generator may be used by security system to generate an ECM. Each ECM may indicate two control words. The control words indicated may be the current control word being used to scramble video and audio, and the control word that will next be used to scramble video and audio. The security system may output an ECM to the multiplexer for transmission to subscribers' set-top boxes. Each data packet, whether it contains audio, video, an ECM, or some other form of data, may be associated with a particular PID. This PID may be used by the set-top box in combination with a networking information table to determine which television channel the data contained within the data packet corresponds. Accordingly, the transponder data streams may contain scrambled video packet stream and audio packet stream and also an encrypted ECM packet stream which contains the control words necessary to descramble the scrambled video and audio packets.

In some embodiments, the harvesting engine 236 may be configured to receive, pull, process, buffer, organize, rank, and/or store adaptable content items 176, particularized content objects 177, and/or programming content 202. In various embodiments, the television service provider system 102, the television receiver 110, and/or the computing device 116 may include one or more applications to facilitate the subsystem 111 analyzing and consolidating data feeds and/or event updates received from various data sources 112. As an example, data feeds and/or event updates may include, but are not limited to, updates (real-time and/or otherwise) and/or continuous data streams received from one or more data sources 112, which may include real-time events related to bookmakers, bookies, sportsbooks, oddsmakers, sports event information, gambling/betting, Twitter® feeds, Instagram® posts, Facebook® updates, and/or the like.

As disclosed above, the adaptable content items 176 may correspond to audiovisual advertisements particularized to certain products and/or services. In some embodiments, the advertisements may correspond to commercials to be presented during commercial breaks of televised events of the programming content 202. In some embodiments, the advertisements may correspond to commercials or other content to be presented as overlays or in windows/frames during televised events. In various embodiments, the content items 176 may include audiovisual content broadcast and/or otherwise transmitted by the television service provider 102. In some embodiments, adaptable content items 176 may be pushed by the television service provider 102 to the subsystem 111. In addition or in alternative, adaptable content items 176 may be pulled by the subsystem 111 (e.g., by the harvesting engine 236) from the television service provider 102.

The particularized content objects 177 may correspond to content that is particularized to certain types of products and/or services and that is sourced by one or more of the service provider systems 103. In various embodiments, the service provider systems 103 may correspond to one or more sources of data and/or services corresponding to bookmakers, bookies, sportsbooks, oddsmakers, sports information, event information, gambling/betting, social media websites, and/or the like, and particularized content objects 177 may correspond to the specific data and/or services sourced by a specific service provider system 103 for a specific event. For example, the data may correspond to odds information with respect to a particular sporting event and a particular outcome of the sporting event and/or of certain potential results/actions that could occur within the event. The services may, for example, correspond to the bookmaker/sportsbook services offered to facilitate betting with respect to the sporting event. As disclosed above, the adaptable content items 176 and/or the content item objects 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, sets of one or more adaptable content items 176 and/or sets of one or more content item objects 177 may be transmitted to the subsystem 111 in batches. For example, sets of one or more adaptable content items 176 and/or sets of one or more content item objects 177 may be transmitted to the subsystem 111 on a periodic or otherwise scheduled basis. The subsystem 111 may store the adaptable content items 176 locally and, subsequently select one or more of the adaptable content items 176 when needed for presentation during an upcoming break in the programming content 202 corresponding to an event and/or when needed for presentation during the programming content 202 corresponding to the event based at least in part on the subsystem 111 determining specifications of the event, a temporal progression in the event (e.g., the fourth quarter, the second round, etc.), a state change in the event (e.g., a score change, one team or competitor leading or falling behind, etc.), and/or the like.

In various embodiments, sets of one or more adaptable content items 176 and/or sets of one or more content item objects 177 may be transmitted to the subsystem 111 on an as-needed basis when the subsystem 111 is receiving programming content 202 corresponding to a certain type (e.g., a televised sporting event for which sports betting information and services are available), is scheduled to receive such programming content 202, is predicted to receive programming content 202 based at least in part on a detected viewing pattern of past viewing of previous programming content 202 (e.g., of a certain type of event, at certain times, on certain days, etc.), and/or is predicted to receive programming content 202 based at least in part on a detected pattern of past viewer responses to content composites for previous programming content 202 of that type. Additionally or alternatively, in some embodiments, sets of one or more adaptable content items 176 and/or sets of one or more content item objects 177 may be selected (e.g., the service provider system 102) as tailored for particular event viewing habits, betting patterns, and inferred interests of viewers.

In various embodiments, sets of one or more adaptable content items 176 may be selected (e.g., by the service provider system 102) for particular time periods and may be transmitted to the subsystem 111 with an assignment (e.g., by way of tag data or other metadata) for the designated time period. Additionally or alternatively, in some embodiments, sets of one or more adaptable content items 176 may be selected (e.g., by the service provider system 102) for particular channels and/or television programs and may be transmitted to the subsystem 111 with an assignment (e.g., by way of tag data or other metadata) for the designated channels and/or television programs. The transmission of the sets of one or more adaptable content items 176 may be in response to the subsystem 111 pulling the sets of one or more adaptable content items 176 from the service provider system 102. For example, the subsystem 111 may pull adaptable content items 176 based at least in part on detecting programming content 202 currently being viewed via a television receiver 110 or computing device 116, detecting programming content 202 scheduled to be viewed or recorded, predicting programming content 202 of interest to a viewer based on detected viewing and/or betting patterns, determining upcoming programming content 202 based on electronic programming guide information received, and/or the like.

In a similar manner, sets of one or more content item objects 177 may be pulled from or pushed by one or more service provider systems 103, in various embodiments using one or more of the various methods disclosed, to the subsystem 111 directly or indirectly (e.g., by way of the television service provider system 102, which may then transmit the content item objects 177 to the subsystem 111) for particular time periods, with assignments for designated channels and/or television programs. For example, in conjunction with the selection of sets of one or more adaptable content items 176, sets of one or more content item objects 177 that match the one or more adaptable content items 176 may be pulled from one or more service provider systems 103. In various examples, the matching may be based at least in part on specifications of the event, a temporal progression in the event (e.g., the fourth quarter, the second round, etc.), a state change in the event (e.g., a score change, one team or competitor leading or falling behind, etc.), and/or the like.

Figure 3:
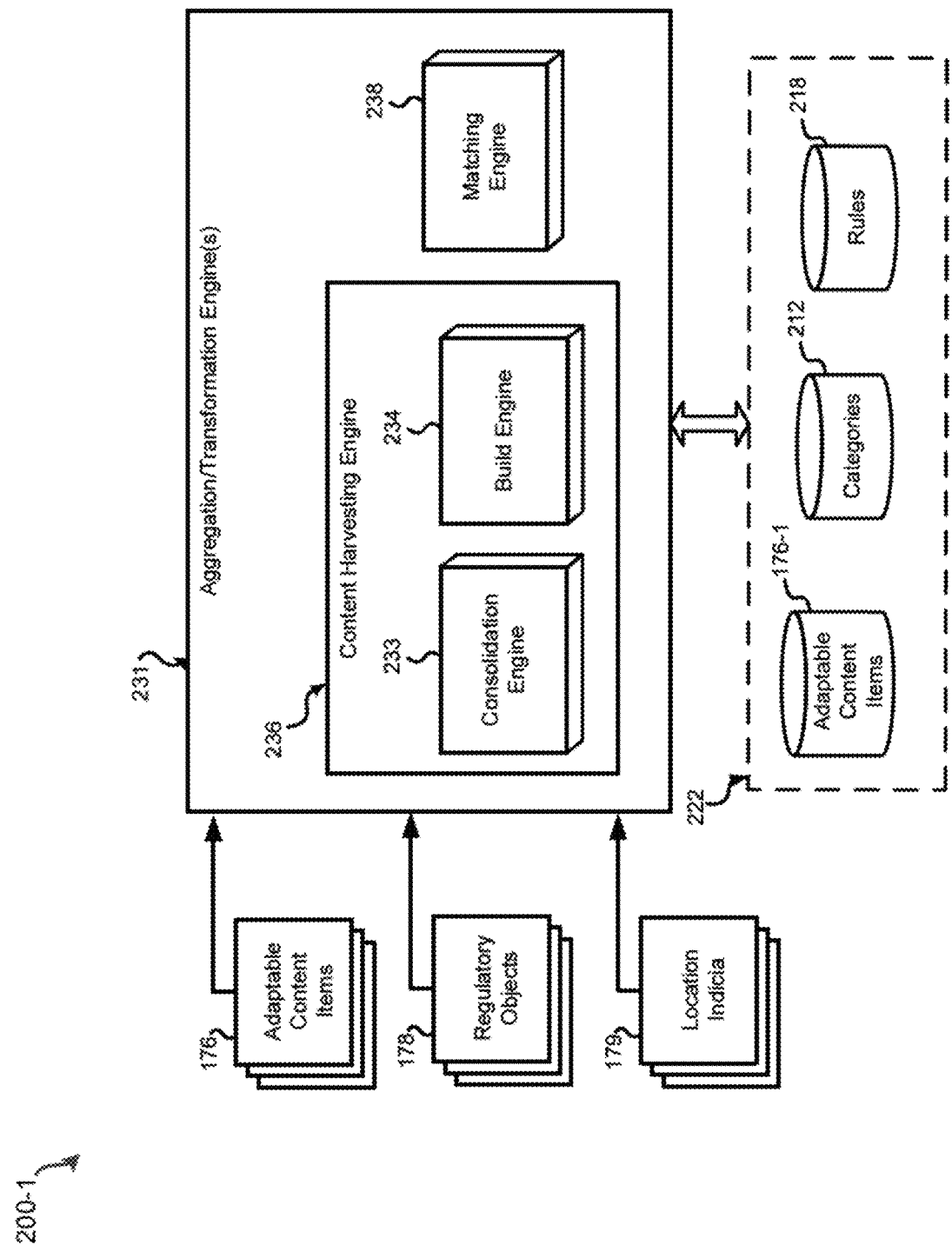
FIG. 3 illustrates a portion of the content splicing system with aggregation and transformation features, in accordance with disclosed embodiments of the present disclosure.

In disclosed embodiments, the television service provider 102 and/or the subsystem 111 may selectively aggregate content. By way of example, FIG. 3 is a simplified illustration of a portion of the content splicing system 200 with aggregation and transformation features, in accordance with disclosed embodiments of the present disclosure. In some embodiments, the subsystem 111 may correspond at least in part to the television service provider 102 and may include one or more data management servers. The subsystem 111 may include one or more aggregation and/or transformation engines 231, which may correspond to the content harvesting engine 236 in some embodiments. In various embodiments, the aggregation and/or transformation engine 231 may correspond to an integral engine or separate engines working in conjunction. The aggregation/transformation engines 231 may translate, transform, or otherwise adjust data collected. The aggregation and transformation engines 231 may provide a pipeline that processes data input from regulatory data sources, applies rules, transforms the data into jurisdiction-specific regulatory rules 218, and uses the rules 218 to adaptively control content composite creation, the delivery of such content, and interactions with such content.

In various embodiments, the harvesting engine 236 may include or otherwise operate in conjunction with a consolidation engine 233. The consolidation engine 233 may process manifold data sets that may, for instance, come from different sources 112 or the same source 112, for example, by way of one or more updates to data previously provided by a particular source 112, and the consolidation engine 233 may consolidate the data sets to form a composite data set. The consolidation may include organizing, categorizing, qualifying, and/or comparing the sets of information; detecting, identifying, and/or handling errors/discrepancies; identifying redundancies; removing redundancies; and/or otherwise processing the data sets. In some embodiments, regulatory objects 178 are consolidated to form set of consolidated rules 218. The objects 178 may correspond to structured data, text, files, documents, and/or the like specifying conditions, criteria, and requirements of jurisdiction-specific regulations. In some embodiments, objects 178 are consolidated and transformed into organized, indexed, categorized, and qualified rules, workflows, and/or decision trees. In some embodiments, the consolidation engine 233 may identify a subset of data, regulatory rules, and/or one or more data sources 112 (e.g., regulatory authority) that are more important than the rest, and may process the subset first. In some embodiments, the consolidation engine 233 may follow an order of precedence in consolidating the data, rules, and/or data sources. In some embodiments, the consolidation may include removing and/or minimizing redundancy of information and requirements of rules to form a compact set of composite information, requirements, and/or restrictions for a particular location, a particular type of event, a particular type of betting, a particular type of bookmaker/sportsbook, a particular type of device, and/or the like.

A build engine 234 may build one or more sets of data, content, rules, one or more indexes, one or more workflows, one or more decision trees, and/or one or more files particularized to one or more locations and based at least in part on selectively aggregated rules 218. In some embodiments, the build engine 234 may build multiple sets that relate to one or more rules, but are tailored for different geolocations, jurisdictions, types of events, types of betting, types of bookmakers/sportsbooks, and/or the like.

In some embodiments, the aggregation/transformation engine 231 may translate the data into understandable data, information, and/or content. The transformed data, information, and/or content may be directed to certain tables, indexes, and/or storages based on one or more particular rules, geolocations, jurisdictions, types of events, types of betting, types of bookmakers/sportsbooks, and/or the like. In some embodiments, the selective aggregation, consolidation, and/or feed actions may be performed on an as-needed basis. For example, the selective aggregation, consolidation, and/or feed actions may be triggered when a change to rules is detected consequent to periodic polling of data source systems 103 for updates to rules and/or comparing newly harvested information to previously harvested information. In some embodiments, the selective aggregation, consolidation, and/or feed actions may be performed on a periodic basis based on any suitable time period.

The service provider systems 103 may include manifold content source systems 112, including, for example, sources 112 of objects 178 corresponding to federal information, state information, local information, and/or the like. The harvesting engine 236 may include logic for implementing content aggregation features in various embodiments. In some embodiments, the harvesting engine 236 may be configured to gather data about rules from one or more service provider systems 103 and/or other data source systems sourcing information (e.g., government systems) through one or more networks 120. By way of example without limitation, the engine(s) with one or more the processors, may utilize one or more network interfaces to pull and/or push code from various entities. As disclosed herein, content may be actively gathered by accessing a repository that corresponds to such entities, and content could be gathered by "crawling" the various repositories in some embodiments. Updates for content source systems 112 may be periodically found. Additionally or alternatively, the television service provider system 102 and/or the subsystem(s) 111 may wait for updates from one or a combination of the content source systems 112. With some embodiments, any one or combination of the content source systems 112 may provide notifications to the television service provider system 102 and/or the subsystem 112 of data to be transferred, such as updated information not previously pulled/pushed to the television service provider system 102 and/or the subsystem 112.

Certain embodiments may also include data being preloaded and/or directly transferred to the television service provider system 102 and/or the subsystem 112 (e.g., via a storage medium) in addition to or in lieu of transferring data via a network 120. The harvesting engine 236 could handle processing, extracting, formatting, and/or storing in content storage 222 data including data for code portions. The harvested data may then be analyzed to determine one or more attributes of the code portions. One or more federal information storages may retain any federal information suitable for embodiments of this disclosure. One or more state information storages may retain any federal information suitable for embodiments of this disclosure. One or more local information storages may retain any federal information suitable for embodiments of this disclosure.

With certain embodiments, the consolidation engine 233 may check data sets and assess each piece of information relating to an aspect (e.g., jurisdiction, such as a federal, state, country, municipal, etc.) and may assign a weight to the information according to a score. Any suitable scoring system may be used. Information may be weighted according to the source. For example, objects 178 having a federal source may preempt information of lower jurisdictions, and may be scored accordingly. State information may preempt county information and municipality information, and may be scored accordingly. Requirements of federal information may be scored as a baseline. Requirements of lower-level jurisdiction information that conflict with requirements of higher-level jurisdiction information may be scored to reflect the conflict and the preemption of the higher-level jurisdictional requirements. Requirements of lower-level jurisdiction information that are complementary and additional to higher-level jurisdictional requirements may be scored accordingly. Requirements of lower-level jurisdiction information that match higher-level jurisdictional requirements may be scored accordingly to reflect the match.

In some embodiments, the matching engine 238, which may be included in or may be separate from the consolidation engine 233, may be or include a classification engine configured to classify regulation/code portions into at least one category of a set of categories 212 that represent classifications of rules based at least in part on one or more sets of attributes defined for classifying rules. In various embodiments, the attributes may correspond to any one or combination of keywords, characterizations, code identifiers (e.g., numerical and descriptive sectional headings and subheadings), jurisdiction identifiers, source identifiers (e.g., for the source of regulation portions acquired), regulation hierarchical indicia (e.g., chapter, section, subsection, etc.), and/or the like corresponding to classification bases disclosed herein. For example, information with respect to a particular code/regulation portion may be analyzed in order to identify one or more code attributes, and the one or more code attributes may be matched to attributes defined for certain categories 212. The matching engine 238 can receive a code portion, identify attributes of the code portion, and match the code portion to one or more categories 212 based on category information retained in storage 222. The code portion may be matched to one or more categories 212 that each represent classifications of rules sharing common attributes. The matching engine 238 may be configured to process first information enabling unique identification of a particular regulation portion and/or requirement of the particular regulation portion, process second information about a first location corresponding to the regulation portion, and match the regulation portion and/or requirement to one or more categories from the set of categories 212. In some embodiments, one or more taxonomies that map keywords of particular regulation portions to particular categories 212 may be used in correlating regulation portions with one or more categories 212. Accordingly, certain embodiments may employ keyword analysis of the regulation portions and map the regulation portions to one or more categories 212 based at least in part on the mapping and keywords recognized.

By way of example, the categories 212 may represent categorization of regulations according to sources. The sources of the regulation could correspond to the regulating authority promulgating the regulation. The sources could be categorized according to jurisdiction (e.g., federal, state, tribal, and/or local jurisdictions). Such categories 212 could be ranked according to precedence (e.g., federal jurisdiction taking precedence over lower-level jurisdictions, state over more local, etc.). The regulation portion could be categorized according to location, for example, a state, tribal nation, county, and/or municipality to which the regulation portion applies. In some cases, a location to which the regulation portion applies may be determined at least in part by the authority promulgating the regulation portion. In addition or in alternative, a location to which the regulation applies may be determined at least in part by inferring the location from keyword analysis of the regulation and/or a larger body of regulations including the particular regulation. The regulation could be linked to one or more location identifiers (e.g., states, county, municipality, and/or zip code identifiers; geo coordinates corresponding to the location; and/or the like). In some embodiments, regulations may be assigned coding identifiers and may be linked to one or more documents, collections, files, fields, database structure/elements, or other forms of associating information. In some embodiments, the coding identifiers assigned to regulations may be indexed with one or more indexes that could include fields for one or more of: coding identifiers; location identifiers; descriptive information associated with each coding identifiers and corresponding regulation(s); rule identifier(s)/pointer(s) for each rule associated with each coding identifiers and/or corresponding regulation(s); and/or the like.

The categorization 212 of the harvested regulations and updated regulations may be used to create various sets of rules 218 governing the creation and provisioning of particularized content composites 180. The various sets of rules 218 may govern the creation and provisioning of particularized content composites 180 as a function of a location of a particular receiver 110 and/or device 116. Hence, different sets of rules 218 may apply to different locations.

A subset of the rules 218 may be the same for a subset of geolocations. For example, in some locations, the particularized content composites 180 may be prohibited explicitly by regulation or implicitly by regulation because related activities are prohibited. For such locations, the system 111 may not create and provision any content composite 180, may provide an alternative content item in lieu of a content composite 180, and/or may create and provision a particularized content composite 180 with a particularized content object 177 that is permissible as not being explicitly and implicitly prohibited by the location-pertinent regulation. As another example, a subset of geolocations may fall under the same jurisdictions and therefore have the same subset of rules 218 applicable by the subsystem 111. In other cases, a subset of geolocations may be in differing jurisdictions but may still have the same subset of rules 218 applicable by the sub system 111.

Various sets of rules 218 may provide for various types of restrictions and/or specifications on creating and/or provisioning content composites 180. In addition to geolocation restrictions/specifications, the various types of restrictions and/or specifications may include time restrictions, such as limits on a time of day when content composites 180 may be presented, limits on time in advance particular event (e.g., days, hours, etc.) and/or portion thereof (e.g., round, quarter, period, etc.) ahead of which content composites 180 may be presented, and the like. Additionally or alternatively, the various types of restrictions and/or specifications may include restrictions on and/or specifications of types of events (e.g., football, soccer, martial arts, types of racing, etc.) for which content composites 180 may or may not be presented and the manner in which content composites 180 may be presented for the different types of events. In some instances, the number and/or frequency of composite 180 presentation may be limited on a per-event basis. Further, the type of betting (e.g., the actions subject to wager) may be restricted by the rules 218 in various ways, depending on the location. Thus, provisioning of content composites 180 may be further differentiated according to event type, with time, place, and/or manner restrictions/specifications contingent on event type. Restrictions on and/or specifications of the manner in which content composites 180 may be presented may include differentiating types of devices (e.g., smart phone versus laptop computer, laptop computer versus television receiver, etc.) which will display the content composites 180.

To facilitate geo-discrimination to differentiate which sets of rules 218 apply to a given content provisioning instance with respect to an event, disclosed embodiments may provide for capturing and analyzing location data 179 for the receiver 110 and/or device 116 to determine a current location of the receiver 110 and/or device 116. Location data 179 may be captured to facilitate geo-sensitive adaptive content splicing adaptive content splicing with respect to content 202 corresponding to a televised event as a function of a location detected for the receiver 110 and/or device 116 that receives the content and is to cause display of content composites 180 in conjunction with the content. In various embodiments, the matching engine 238 may include a location correlation engine that may correlate location data 179 to a set of one or more zip codes (or other postal codes) and a corresponding rule set identifier for a set of one or more rules 218 mapped to the set of one or more zip codes (or other postal codes) via identifiers keyed with one or more tables and/or indexes.

In various embodiments, location data may be determined by television receivers 110 and/or devices 116, and such data may be sent to the system 102. The television receivers 110 and/or devices 116 may, in some embodiments, have location detection capabilities based at least in part on location data provided by way of device GPS capabilities, Wi-Fi, cellular, other access points, subscriber/account information, and/or the like techniques for determining a current location of the respective receiver 110 and/or device 116, and corresponding location data 179 may be transmitted to the system 102. In some embodiments, the system 102 may gather the location data 179. In some embodiments, where the location data 179 does not explicitly indicate a geolocation, the system 102 may determine geo-locations by cross-referencing subscriber/account identifiers with stored geolocation data associated with subscribers/accounts.

In some embodiments, the receiver 110 and/or device 116 may include at least one antenna for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The antenna may include a cellular antenna (e.g., for sending and receiving cellular voice and data communication, such as through a network such as a 3G, 4G, or 5G network). In addition, the receiver 110 and/or device 116 may include one or more interfaces in addition to the antenna, e.g., a wireless interface coupled to an antenna. The receiver 110 and/or device 116 may include one or more communications interfaces that can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the receiver 110 and/or device 116 may include may be capable of transmitting and receiving information wirelessly through both short range, radio frequency (RF) and cellular and Wi-Fi connections.

Additionally, in some embodiments, the receiver 110 and/or device 116 may be capable of communicating with a Global Positioning System (GPS) in order to determine to location of the respective receiver 110 and/or device 116. The antenna may be a GPS receiver or otherwise include a GPS receiver. In various embodiments, communication with the receiver 110 and/or device 116 may be conducted with a single antenna configured for multiple purposes (e.g., cellular, transactions, GPS, etc.), or with further interfaces (e.g., three, four, or more separate interfaces). In some embodiments, an application installed on the receiver 110 and/or device 116 may cooperate with the system 102 to facilitate tracking of locations of the receiver 110 and/or device 116. For example, the receiver 110 and/or device 116 may transmit location data 179 to any suitable backend system component. The location data 179 may be a combination of data based on one or a combination of GPS, Wi-Fi, cellular, device sensor(s) such as a barometric sensor or accelerometer, RFID device signals, and/or other techniques for determining a current location of the receiver 110 and/or device 116.

The receiver 110 and/or device 116 may access the one or more networks 120 through one or more wireless links to one or more access points. The access points may be of any suitable type or types. For example, an access point may be a cellular base station, an access point for wireless local area network (e.g., a Wi-Fi access point), an access point for wireless personal area network (e.g., a Bluetooth access point), etc. The access point may connect the receiver 110 and/or device 116 to the one or more networks 120, which may include the Internet, an intranet, a local area network, a public switched telephone network (PSTN), private communication networks, etc. In some embodiments, access point(s) may be used in obtaining location data 179 for the receiver 110 and/or device 116.

Figure 4:
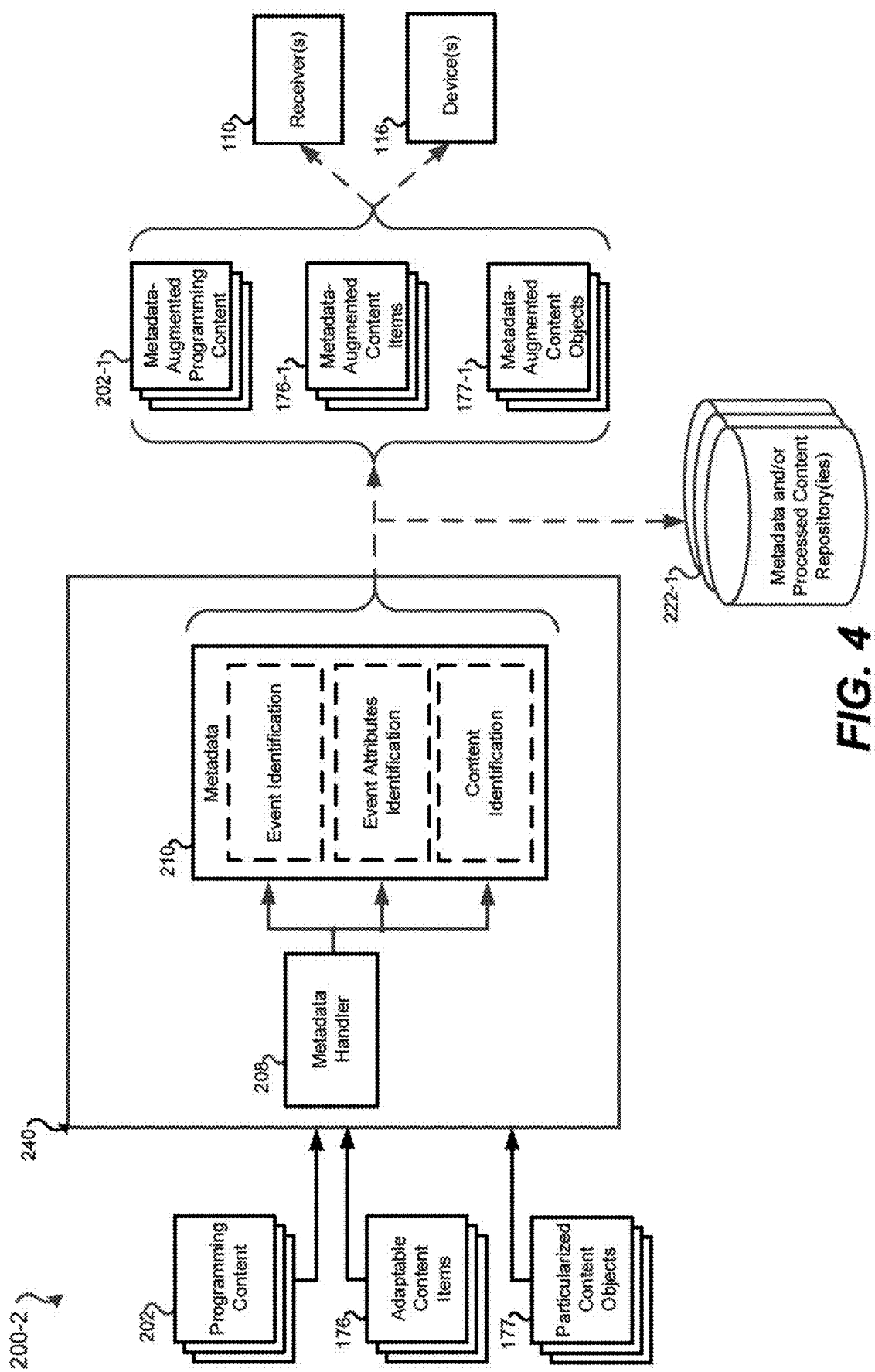
FIG. 4 illustrates a metadata augmentation engine, in accordance with disclosed embodiments of the present disclosure.

FIG. 4 is a simplified illustration of a metadata augmentation engine 240, in accordance with disclosed embodiments of the present disclosure. In various embodiments, the metadata augmentation engine 240 may be included in the subsystem 111 or may be separate from the subsystem 111. The metadata augmentation engine 240 may, in some embodiments, be included in the television service provider system 102. The metadata augmentation engine 240 may include a metadata handler 208 that may generate metadata 210 (e.g., one or more tags 210) corresponding to identifiers, attributes, characteristics, and/or categories of programming content 202, adaptable content items 176, and/or particularized content objects 177.

In various embodiments, the metadata 210 may be inserted into the output programming content 202, output adaptable content items 176, and/or output particularized content objects 177. In some embodiments, the one or more tags 210 may not be inserted into the programming content 202, adaptable content items 176, and/or particularized content objects 177 but may be sent with the output programming content 202, output adaptable content items 176, and/or output particularized content objects 177. For example, metadata augmentation engine 240 may assign packet identifiers to identify data of the content that is to be transmitted as part of a data stream to a receiver 110 and/or device 116 and that is to be associated with one or more tags. Accordingly, the content splicing subsystem 111 may output one or a combination of metadata-augmented programming content 202-1, metadata-augmented content items 176-1, and/or metadata-augmented content objects 177-1. In some embodiments, one or a combination of metadata-augmented programming content 202-1, metadata-augmented content items 176-1, and/or metadata-augmented content objects 177-1 may be stored at least temporarily in one or more repositories 222. In some embodiments, tag data may be stored at least temporarily in one or more repositories 222.

Data transmitted as part of a data stream to a television receiver 110 and/or device 116 may be packetized and assigned packet identifiers. A particular packet identifier may be associated with data packets related to tags for particular segments of metadata-augmented programming content 202-1, metadata-augmented content items 176-1, and/or metadata-augmented content objects 177-1.

The content matching engine 238 may identify a televised event in the programming content 202 and may identify one or more corresponding identifiers, attributes, characteristics, and/or categories of programming content 202, adaptable content items 176, and/or particularized content objects 177 of one or more adaptable content items 176 and/or one or more particularized content objects 177. Based at least in part on such identification, the metadata augmentation engine 240 may create metadata 210, which, in some embodiments, may correspond to tag data. Hence, the metadata augmentation engine 240 may process programming content 202, adaptable content items 176, and/or particularized content objects 177 and provide tagged programming content 202, tagged adaptable content items 176, and/or tagged particularized content objects 177.

Tag data may include an indication of a period of time (or other measure of time, e.g., a number of frames), a start frame, an end frame, and/or the like. Tag data may include or otherwise be associated with a tag identifier and may include event, attribute, characteristic, and/or category identifiers. For example, the metadata for the televised event may identify the particular event (e.g., any suitable identifier for a game, match, competition, and/or the like). The metadata may further identify one or more attributes of the particular event (e.g., any suitable identifier for the competitors, the location of the event, and/or the like). In some embodiments, at least a portion of the metadata augmentation may be performed at the television service provider system 102 such that tagged programming content 202 is provided to the receivers 110 and/or devices 116. Subsequently, the receivers 110 and/or devices 116 may identify particular events responding to the programming content 202 and may identify attributes of the particular events, for example, by processing the metadata of the programming content 202.

The metadata for adaptable content items 176 may, for example, identify the adaptable content items 176 as being adaptable with any suitable identifier, such as a flag, field value, etc. Additionally or alternatively, the metadata for the adaptable content items 176 may identify that the adaptable content items 176 are designated for a certain event or category of events with any suitable identifier. The metadata for the adaptable content items 176 may further identify one or more attributes of the particular event (e.g., any suitable identifier for the competitors, the location of the event, a temporal attribute such as a time of the event or a progression of the event, and/or the like). Additionally or alternatively, the metadata for the adaptable content items 176 may identify transition points, hooks, frames, windows, other portions designated for overlays, and/or the like for merging with content objects 177 such that content from the content objects 177 is merged at the transition points, hooks, frames, windows, other portions designated for overlays, and/or the like.

Metadata-augmented adaptable content items 176 may be provided by the service provider system 102 to the receivers 110 and/or devices 116, after which the receivers 110 and/or devices 116, each having at least a portion of the content splicing subsystems 111, may process and use the metadata to facilitate matching adaptable content items 176 with corresponding televised events of the programming content 202. Likewise, the receivers 110 and/or devices 116 may process and use the metadata to facilitate matching adaptable content items 176 with corresponding content objects 177 and then creating content composites 180 therefrom. Thus, the metadata may facilitate the receivers 110 and/or devices 116 appropriately providing corresponding content composites 180 for display with appropriate placement with respect to televised events at commercial breaks and/or during event presentation.

In a similar manner, metadata-augmented content objects 177 may be provided by the service provider system 102 to the receivers 110 and/or devices 116. The metadata for adaptable content objects 177 may, for example, identify an identifier of the particular event (e.g., any suitable identifier for a game, match, competition, and/or the like). The metadata for the content objects 177 may further identify fields and content for one or more attributes of the particular event, such as any suitable identifier for the competitors, the location of the event, a temporal attribute such as a time of the event or a progression of the event, performance metrics of one or more competitors in the event (e.g., possession time, attempts, hits, strikes, takedowns, interceptions, completions, baskets, assists, fouls, etc.), a state change in the event (e.g., a score change, one team or competitor leading or falling behind, etc.), odds information with respect to a particular sporting event and a particular outcome of the sporting event and/or of certain potential results/actions that could occur within the event, URLs and hyperlinks to betting platforms and websites and/or sites for further information, and/or the like. In some embodiments, at least a portion of the metadata augmentation may be performed at the service provider system 102 and/or the service provider system 103 such that tagged content objects 177 are provided to the receivers 110 and/or devices 116 from the systems 102 and/or 103. Subsequently, the receivers 110 and/or devices 116 may process and use the metadata to facilitate matching adaptable content items 176 with corresponding content objects 177 and then creating content composites 180 therefrom. Thus, the metadata may facilitate the receivers 110 and/or devices 116 matching adaptable content items 176 with corresponding content objects 177 and then creating content composites 180. Alternatively, the receivers 110 and/or devices 116, having at least a portion of the content splicing subsystem 111, may process the content objects 177 in the form in which they are received (e.g., directly from a service provider 103) and, based on such processing, may match the content objects 177 to a particular event and/or may identify other attributes of the content objects 177 without the content objects 177 being received as augmented with metadata. In any case, in some embodiments, the receivers 110 and/or devices 116, each having at least a portion of the content splicing subsystems 111, may create the content composites 180. Yet, as another alternative, the service provider 102, having at least a portion of the content splicing subsystem 111, may create the content composites 180 and transmit the content composites 180 to the receivers 110 and/or devices 116.

Referring again more particularly to FIG. 2, the matching engine 238 may be configured to match adaptable content items 176 to segments of programming content 202 based at least in part on metadata at a service provider system 102 side or at a client-side television receiver 110 and/or device 116, in accordance with various embodiments. For example, metadata may be extracted when or before a given segment of programming content 202-1 is to be output for display and before a transition point. In some embodiments, the matching engine 238 may read the metadata mapped to the segment and perform a search of the repositories 222 for one or more adaptable content items 176 that have metadata matching the extracted metadata with respect to one or more of event identification, event category identification, and/or temporal identification, with the highest preference given to the adaptable content item 176 that has metadata most closely matching the metadata of the previous segment. Alternatively, the matching engine 238 may read the metadata mapped to the segment and pull one or more adaptable content items 176 from the service provider system 102. In so doing, the subsystem 111 may transmit at least a portion of the metadata of the programming content 202 to the service provider system 102 in order to facilitate matching the extracted metadata with one or more adaptable content items 176 with respect to one or more of event identification, event category identification, and/or temporal identification. Consequently, the service provider system 102 may transmit one or more matching adaptable content items 176 to the subsystem 111, which may be integrated with a receiver 110 and/or device 116. Some embodiments may include the subsystem 111 configured to perform a search of the repositories 222 for one or more adaptable content items 176 that have metadata matching the extracted metadata in addition to pulling one or more adaptable content items 176 from the service provider system 102. For example, the subsystem 111 may first perform a search of the repositories 222 for any matching adaptable content items 176 and then only pull one or more adaptable content items 176 from the service provider system 102 when no adaptable content items 176 are found in the search of the repositories 222 that match the extracted metadata with a sufficient match score that indicates a level of correlation satisfying a correlation threshold. Accordingly, certain embodiments may facilitate matching of adaptable content items 176 to segments of programming content 202 based at least in part on metadata.

In a similar manner, the matching engine 238 may be configured to match particularized content objects 177 to one or both of adaptable content items 176 and segments of programming content 202 based at least in part on metadata at a service provider system 102 side or at a client-side television receiver 110 and/or device 116, in accordance with various embodiments. For example, the metadata extracted and read when or before a given segment of programming content 202-1 is to be output for display and before a transition point may be mapped to the segment, and, in some embodiments, the matching engine 238 may and perform a search of the repositories 222 for one or more content objects 177 that have metadata matching the extracted metadata with respect to one or more of event identification and, in some instances, temporal identification, with the highest preference given to the adaptable content item 176 that has metadata most closely matching the metadata of the previous segment. In such cases where the repositories 222 are searched for one or more content objects 177, the one or more content objects 177 may have been previously transmitted to the subsystem 111 directly from one or more service provider systems 103 or indirectly from one or more service provider systems 103 by way of the service provider system 102. Such content objects 177 may include temporal identification indicating a time for which content corresponding to the object 177 remains in effect. For example, each content object 177 may comprise content for which an expiration is specified (e.g., with one or more of time, date, duration, etc.). Accordingly, the matching engine 238 may perform a staleness check by examining the metadata of any such content objects 177 retrieved from the repositories 222 to determine whether the content objects 177 have expired with respect to the current time and date.

Alternatively, the matching engine 238 may read the metadata mapped to the segment and pull one or more content objects 177 from the service provider system 102 and/or one or more service provider systems 103. In so doing, the subsystem 111 may transmit at least a portion of the metadata of the programming content 202 to the service provider system 102 and/or one or more service provider systems 103 in order to facilitate matching the extracted metadata with one or more content objects 177 with respect to one or more of event identification, event category identification, and/or temporal identification. Consequently, the service provider system 102 and/or one or more service provider systems 103 may transmit one or more matching content objects 177 to the subsystem 111. Additionally or alternatively, in some embodiments, the subsystem 111 first obtain one or more matching adaptable content items 176, then read metadata from the one or more matching adaptable content items 176, and transmit at least a portion of the metadata to the service provider system 102 and/or one or more service provider systems 103 in order to facilitate matching the metadata with one or more content objects 177.

Some embodiments may include the subsystem 111 being configured to perform a search of the repositories 222 for one or more content objects 177 that have metadata matching the metadata of one or both of adaptable content items 176 and the segment of programming content 202 in addition to pulling one or more content objects 177 from the service provider systems 102 and/or 103. For example, the subsystem 111 may first perform a search of the repositories 222 for any matching content objects 177 and then only pull one or more content objects 177 from the service provider systems 102 and/or 103 when no non-expired content objects 177 are found in the search of the repositories 222 that match the metadata with a sufficient match score that indicates a level of correlation satisfying a correlation threshold. In some embodiments, the subsystem 111 may first attempt to pull one or more content objects 177 from the service provider system 102 and, in the case that no matching non-expired content objects 177 are successfully pulled from the service provider system 102 within a time threshold after the initial request, then pull one or more content objects 177 from one or more service provider systems 103. Likewise, the subsystem 111 may attempt to pull one or more content objects 177 from a first set of one or more service provider systems 103 and, in the case that no matching content objects 177 are successfully pulled from the first set of one or more service provider system 103 within a time threshold after the initial request, then pull one or more content objects 177 from a second set of one or more service provider systems 103. In some embodiments, the subsystem 111 may implement all three of the aforementioned stages of pulling content objects 177 from the service provider system 102, then the first set of one or more service provider systems 103, and then a second set of one or more service provider systems 103. In such embodiments, the time thresholds may be different for each stage, e.g., decreasing or increasing in time. Additionally, the size of the selected sets of service provider systems 103 may be different for each stage, e.g., decreasing or increasing in size. Accordingly, various embodiments may facilitate matching of particularized content objects 177 to segments of programming content 202 and/or adaptable content items 176 based at least in part on metadata.

The matching engine 238 may take the identified characteristics of a given segment of programming content 202 as cues to retrieve one or more corresponding adaptable content items 176 and one or more content objects 177 for the content splicing engine 242 to output one or more content composites 180 for presentation after the segment of programming content 202 (e.g., at a commercial break) or during the segment of programming content 202 (e.g., as an overlay, in a side window/frame, etc.) to match the identified characteristics of the programming content 202. According to some embodiments, the matching engine 238 may employ one or more artificial intelligence algorithms to identify characteristic patterns in the programming content 202 which may correspond to triggers for intra-event creation of composites 180 for presentation at an upcoming break or during the event.

As one example case out of many possibilities, say a state change in a televised event of programming content 202 occurs (e.g., a score change, one team or competitor leading or falling behind, a takedown, a foul, etc.) and/or temporal progression benchmark (e.g., the fourth quarter, the second round, etc.) is reached. The subsystem 111 may detect the state change and, in response, initiate creation of composites 180 for presentation at an upcoming break or during the event. Accordingly, the dialogue may trigger composite 180 creation and presentation so that the composite 180 may be dynamically inserted in the content stream within a short time (e.g., substantially, seconds, within a minute, with environments, etc.) after the state change. In various embodiments, the subsystem 111 may detect the state change the way of keyword recognition of a dialogue from an announcer (e.g., detecting words such as touchdown, goal, takedown, foul, minutes on the clock, etc.), sudden changes in crowd noise, and/or image recognition (e.g., detecting graphics displayed with a televised event such as a scoreboard, streaming tickers or overlays typically positioned and/or scrolling across a portion of the display area, etc.).

To facilitate audio recognition, the content splicing subsystem 111 (e.g., by way of the matching engine 238) may be configured to detect one or more audio characteristics in adaptable programming content 202. In some embodiments, the matching engine 238 may include an audio analyzer and handling module to facilitate that detection. By way of example, the matching engine 238 may detect one or more audio characteristics in programming content 202 by way of any one or combination of analyzing closed captioning information, analyzing audio, applying voice recognition, acoustic spectrum analysis, comparison to acoustic profiles for types of events, and/or the like.

Some embodiments of the content splicing subsystem 111 may store acoustic profiles mapped to types of programming content 202 and corresponding state changes in the processed content repository. Each acoustic profile may specify one or more selected values of acoustic metrics as distinctive markings and/or acoustic categories 214 as characteristics of the types of programming content 202 and corresponding state changes. In various embodiments, the matching engine 238 may analyze the audio tracks metadata track, and/or close captioning information to identify dialogue as distinctive markings of state changes. The matching engine 238 may identify one or more keywords and/or expressions in the dialogue as a dialogue impression for the purposes of characterizing the sample and identifying state changes. The matching engine 238 may compile the keywords and/or expressions of the sample and retain the keywords and/or expressions and corresponding state changes in the dialogue impression. In some cases, the matching engine 238 may correlate the dialogue impression to one or more dialogue categories 212 for similar dialogue impressions and corresponding state changes. In various embodiments, the correlation may be based at least in part on matching selected keywords and/or expressions to identical and/or similar keywords and/or expressions specified for certain dialogue categories 212. The dialogue categories 212 may include categorizations of concept, keyword, expression, and/or the like mapped to corresponding state changes.

Based at least in part on the dialogue impression, the matching engine 238 may create a dialogue profile for a given segment and/or type of programming content 202 and corresponding state changes. The dialogue profile may be retained in any suitable form, such as a file, a list, etc. The content splicing subsystem 111 may store dialogue profiles mapped to segments of programming content 202 and corresponding state changes in the processed content repository. Each dialogue profile may specify one or more selected keywords and/or expressions as distinctive markings and/or dialogue categories 212 as characteristics of the segment and/or type of programming content 202 and corresponding state changes.

To facilitate image recognition, some embodiments of the content splicing subsystem 111 (e.g., by way of the matching engine 238) may be configured to detect one or more color characteristics in programming content 202, which may include any suitable color characteristic that may be measured recognize alphanumerical images corresponding to such state changes. In some embodiments, the matching engine 238 may include an image analyzer and handling module to facilitate that detection. By way of example, the matching engine 238 may detect one or more color characteristics in programming content 202 by way of any one or combination of pixel identification, detecting color component values, detecting color codes, and/or the like. Some embodiments may sample only portions of images, such as only part of a frame (which could, for example, be specified by identification of pixel coordinates and ranges thereof to define areas of interest). Some embodiments may sample only a central portion of a frame. Other embodiments may only sample a non-central portion, such as a border portion of a frame. Some embodiments may start with one portion of a frame and only sample to until a state change is recognized.

The matching engine 238 may perform correlation based at least in part on correlation rules 218. The matching engine 238 may correlate segments of programming content 202 to state changes based at least in part on one or a combination of such characteristics. In some embodiments, the correlation may be based at least in part on the color profiles, acoustic profiles, and/or dialogue profiles of types and/or segments of programming content 202. In some embodiments, the correlation may be based at least in part on color, dialogue, and/or acoustic categories 212.

The correlation rules 218 may include correlation criteria that could include keywords identified by any one or combination of words, word stems, phrase, word groupings, and/or like keyword information. The correlation criteria could include weightings assigned to dialogue specifications. Hence, within each dialogue bucket, a keyword could be assigned a weight according to its significance. By way of example, more significant keywords could be assigned a greater weight than stop words. Such buckets could be implemented in any suitable manner, including lists, tables, matrices, and/or the like. And within a bucket, characteristics and/or keywords could be organized in a rank order and/or any hierarchical structure according to weight. Some embodiments may have characteristics and/or keywords organized according to decision tree, with contingencies so that only certain combinations of characteristics and/or keywords may be considered. For example, certain characteristics and/or keywords could only have significance if used in conjunction with other keywords, and/or not in conjunction with others.

In some embodiments, the matching engine 238 may employ a scoring system to quantify correlations with a numerical expression, for example, a match score, with higher scores being assigned to higher correlations of segments of programming content 202 with state changes. Higher scores may be assigned for greater extents of matching. For example, a match of three dialogue cues or dialogue categories may be assigned a higher score than a match of only one top dialogue cue and/or dialogue category. As another example, an exact match of words, expressions, and/or dialogue categories may be assigned a higher score than a complimentary match (e.g., where absent an exact match, a word, expression, and/or dialogue category is defined as a complement to another a word, expression, and/or dialogue category).

Further, the matching engine 238 may correlate the state changes to corresponding adaptable content items 176 that the subsystem 111 has stored locally to identify one or more of which that are particularized to some extent to the types of state changes detected. In some embodiments, a set of adaptable content items 176 may be ranked according to correlation such that the strongest matching content item 176 is ranked highest, and the ranked set may be selected for composite 180 creation in the ranked order consequent to the matched segment of programming content 202.

As disclosed herein, the subsystem 111 may determine that the programming content 202 corresponds to a televised event for which content composites 180 creation is an option. The subsystem 111 may detect a location corresponding to the computing device 116 and the receiver 111, and may determine from rules 218 whether the provisioning of content composites 180 of certain type are prohibited for the location. In the case where the subsystem 111 determines that there is no prohibition for the location, the subsystem 111 may determine a set of the rules 218 that govern timing restrictions and specifications, event type restrictions and specifications, place and manner restrictions and specifications, and types of adaptations of the adaptable content items 176 with the particularized content objects 177 to create the composites 180. Various sets of rules 218 may provide for various types of adaptations of the adaptable content items 176 with the particularized content objects 177, and the subsystem 111 may determine which set of rules 218 apply to a given receiver 110 and/or device 116 as a function of the location of the receiver 110 and/or device 116.

The place and manner restrictions and specifications of the geo-specific rules 218 may govern how composites are provisioned with respect to programming content 202 (e.g., as a commercial, as a real-time pop-up, as a real-time overlay, as an inset frame, and/or like), which may be a function of the type of event and/or the type of end-user device. For example, a set of rules 218 may specify that composites 180 may only be provided during commercial breaks of televised event. Another set of rules 218 may specify that composites 180 may be provided as overlays, frames, and/or pop-ups during the televised event. In such cases, the rules 218 may require the user opt in and request such overlays, frames, and/or pop-ups during presentation of the televised event. Accordingly, one or more user-selectable options may be presented to the user via the receiver 110 and/or device 116 to allow request overlays, frames, and/or pop-ups during presentation of the televised event. Such user-selectable options may be provided with composites 180 that are presented and during commercial breaks. Thus, contingent upon user selection of the options, presentation of composites 180 may transition to overlays, frames, and/or pop-ups during presentation of the televised event. Likewise, one or more user-selectable options may be presented to the user via the receiver 110 and/or device 116 to prohibit content composite 180 provisioning. Upon user selection of such prohibition, the subsystem 111 may present alternative content items in lieu of content composites 180 during commercial breaks.

In like manner, one or more user-selectable options may be presented to the user via the receiver 110 and/or device 116 to allow content composite 180 provisioning to a secondary device 116 concurrently with the presentation of the televised event. Such provisioning to a secondary device 116 may be provided by way of one or combination of application installed on the secondary device 116, communications from the receiver 110, communications from the service provider system 102, a near field communication interface (e.g., contactless interface, Bluetooth, optical interface, etc.), wireless communications interfaces capable of communicating through a cellular data network, or through Wi-Fi, such as with a wireless local area network (WLAN), and/or the network 120. By way of example, a composite 180 may be presented via a television receiver 110 on a display 160 with one or more user-selectable options that allow redirection of composites 180 to a secondary device 116 consequent to user selection.

The redirection of composites 180 to the secondary device 116 may include options to cast the televised event from the receiver 110 to the secondary device 116 and/or the composites 180. To facilitate such a mode of operation, various embodiments may include the receiver 110 and/or the device 116 incorporating at least portions of the subsystem 111 provide various features.

According to one option, the secondary device 116 may receive the same content, including composites 180 as commercial segments and/or overlays, being displayed on the display device 160 with simulcasting to the secondary device 116 so that the secondary device 116 need only display the augmented content. According to another option, the television receiver 110 may provide the programming content to the display device 160, and the secondary device 116 may receive the programming content and splice composites 180 into the content displayed with the device 116. In various embodiments, the device 116 may receive the composites 180 for splicing from the receiver 110, may receive the composites 180 for splicing from the service provider system 102, and/or may receive adaptable content items 176 and content objects 177 from the receiver 110 and/or the system 102 in order that the device 116 may create provision composites 180 therefrom. In some modes of operation, the television receiver 110 may present alternative content items with the display device 160 in lieu of content composites 180, while the content composites may be shunted to the secondary device 116. Thus, the secondary device 116 may receive composites 180 that would otherwise be displayed on the display device 160. In some embodiments and options, the receiver 110 may not cast to the televised event, but the device 116 may present composites 180 without the televised event. For example, according to some options, an application for the device 116 may be downloaded, installed, and initiated to facilitate content provisioning on the device 116 and interaction with one or a combination of the receiver 110, system 102, and/or one or more systems 103. Accordingly, various embodiments may provide various user-selectable options for transitioning from just viewing a televised event to displaying and interacting with composites 180 and service provider systems 103 via a secondary device 116, while a televised event corresponding to the composites 180 is being displayed on another device such as display device 160 the receiver 110.

In addition, in disclosed embodiments may provide for multicast modes responding composite 180 features. The television receiver 110 may provide multicasting of a plurality of televised events (e.g., from multiple channels, sites, etc.) simultaneously. The plurality of televised events may be presented on the display device 160 plurality of tiles or other segments of the display device 160, where each tile or other segment is dedicated to a particular televised event. In that manner, the viewer may view multiple televised events simultaneously with the same screen. In addition or in alternative, the plurality of televised events may be presented on a plurality of display devices 160 (e.g., in a sports bar context). In that manner, multiple televised events may be simultaneously presented with multiple devices 160, where each display device 160 is dedicated to a single televised event or multiple televised events, depending on the mode selected. Further in addition or in alternative, multiple televised events may be simultaneously presented in conjunction with casting to a computing device 116 such that the device 116 may simultaneously present are televised events that are different from one or more televised events displayed with one or more display devices 160. In such multicast modes, the composite 180 features may include identifying state changes in one or more events as disclosed herein and highlighting in any suitable graphical and/or audio manner the televised event on of the plurality of televised events where the state change is detected and one or more composites 180 are about to be provided. For example, the frame/segment corresponding to the televised event may be highlighted one or more colors and/or may be increased in size relative to other frames/segments. Further, the audio for the particular frame/segment may be turned on or increased so as to draw attention to the particular televised event where the state change occurred and the composite 180 is about to be presented. As another example, some embodiments may cause such graphical and/or audio highlighting with the device 116 and/or may provide the composite 180 to the device 116. Advantageously, with embodiments disclosed further herein, particular types of state changes and events may be matched to particular viewers or patterns so that notifications and composites 180 with respect to particular state changes that the particular viewers have demonstrated interest in may be targeted to the particular viewers. Accordingly, notifications and composites 180 may be tailored to an individual viewer that may be utilizing a device 116 in a multicast or sports bar mode context.

In accordance with the geo-specific rules 218, the subsystem 111 may detect a trigger for composite 180 creation that corresponds to a need for presentation of one or more composites 180 during an upcoming break in the programming content 202 corresponding to an event and/or during the presentation programming content 202 corresponding to the event. Detecting a trigger may include determining timing specifications of the event and a temporal progression in the event (e.g., the fourth quarter, the second round, etc.), detecting a state change in the event (e.g., a score change, one team or competitor leading or falling behind, etc.), and/or the like.

When the subsystem 111 detects a trigger, the subsystem 111 may receive and/or select from one or more adaptable content items 176 provided by the system 102 as matching particular segments of the televised event and one or more content objects 177 to generate and output for display, utilizing the content splicing engine 242, one or more composites 180 to display as a commercial during a programming break after a particular segment or as an intra-program overlay, frame, window, pop-up, and/or the like presented concurrently with the televised event. For example, a content object 177 may include text, one or more images, links, URLs, buttons, other user interface elements, and/or the like which the content splicing engine 242 may aggregate, process, format, crop, rescale, and/or otherwise prepare and include in composites 180 for insertion into the content stream for output with the programming content 202 and/or during breaks of the programming content 202. By way of example, a content composite 180 may include a combination of graphics, video, audio, and/or one or more links along with the message such as: "The Broncos are up 21-7 at halftime—check out the latest odds," "Ohio State is up 35-3, place a bet on the second half of the game," or "Think Tennessee can come back? The current odds are 7:1." Thus, the content splicing engine 242 may identify content portions for augmentation by processing the content object 177, reading the object 177 or certain portions thereof, and determine portions for augmentation in video segments. In some embodiments, portions of images and/or frames of the adaptable content item 176 may be overwritten with captured content from the content object 177.

The content splicing engine 242 may identify one or more portions of adaptable content item 176 to be augmented based at least in part on content object 177, which may, in various embodiments, be identified by image analysis and/or analysis of tag data that defines one or more areas within frames that correspond to certain portions represented within the frames for augmentation. As disclosed herein, such tag data could define the area of interest in any suitable way in various embodiments which could be by way of any one or combination of mattes, masks, pixel identification (which could, for example, include identification of pixel coordinates and ranges thereof to define areas of interest), pixel color component characteristics such as color component values, overlays, and/or the like, allowing for correlation to the area to be augmented in any suitable way. In some embodiments, a processor (such as a main processor, a core processor, digital signal processor, and/or like) may take a definition of the augmentation area with respect to one or more reference frames and may perform auto-correlation of related images in a video stream to identify/define the augmentation areas in other frames of the video sequence that represent the portion to be augmented. Image characteristics (e.g., color, brightness, etc.) of the area of interest with respect to the reference frame(s) could be measured, quantified, and/or otherwise identified, and matched with measured image characteristics of the other frames to define the area to be augmented in multiple frames in an image-changing sequence. Accordingly, certain embodiments may allow for handling the complexity of multiple on-screen options by differentiating particular areas in dynamic, image-changing content.

The user-selectable options presented with the composite 180 may allow for taking actions, such as selecting one or more URLs and/or hyperlinks to one or more betting platforms, websites, and/or sites for further information and placing bets. As disclosed herein, the user-selectable options may include one or more options to transition provisioning of one or more composites 180 to a secondary device 116 and/or to request notifications from the one or more betting platforms, websites, and/or sites be sent to the secondary device 116 so that the secondary device 116 may be used to interact with the platforms and sites via an application installed on the secondary device 116. In that way, a user may place bets and otherwise interact with the one or more platforms and sites via the secondary device 116 while viewing the televised event on a primary display associated with a receiver 110 and/or primary device 116.

As illustrated by FIG. 3, the content processing subsystem 111 may include a learning engine 239 that may be an analysis engine that employs machine learning. The learning engine 239 may further employ deep learning. Accordingly, the learning engine 239 may facilitate machine learning or, more specifically, deep learning, to facilitate creation, development, and/or use of viewer pattern data 216. As disclosed herein, the subsystem 111 may determine a televised event that the viewer actually is viewing, is about to view (e.g., the televised event is scheduled to play on the channel that the viewer is currently viewing), or is likely to view as determined with the learning engine 239. The subsystem 111 may push information indicating the televised event to one or more service provider systems 102 and/or 103. In some embodiments, the service provider system 102 may select one or more adaptable content items 176 matching the televised event for transfer to the subsystem 111 which, as disclosed herein, may be a part of the television service provider system 201 and/or may be part of the receiver 110 and/or devices 116. The subsystem 111 may select from the one or more adaptable content items 176 as matching particular segments of the televised event and, utilizing a content splicing engine 242 in some embodiments, may output one or more corresponding content composites 180 for display after the particular segments and/or simultaneously with the particular segments.

In various embodiments, one or more of the service provider systems 102, 103 may select one or more particularized content objects 177 matching the televised event for transfer to the subsystem 111. In some embodiments, one or more of the service provider systems 102, 103 may select a set of one or more particularized content objects 177 for transfer (e.g., based on recency of information updates corresponding to the content objects 177) for transfer to the subsystem 111, and the subsystem 111 may determine which content objects 177 from the set match the televised event. As disclosed above, the content splicing subsystem 111 may include a matching engine 238 that may include logic to implement and/or otherwise facilitate any taxonomy, classification, categorization, correlation, mapping, qualification, scoring, organization, and/or the like features disclosed herein.

Figure 5:
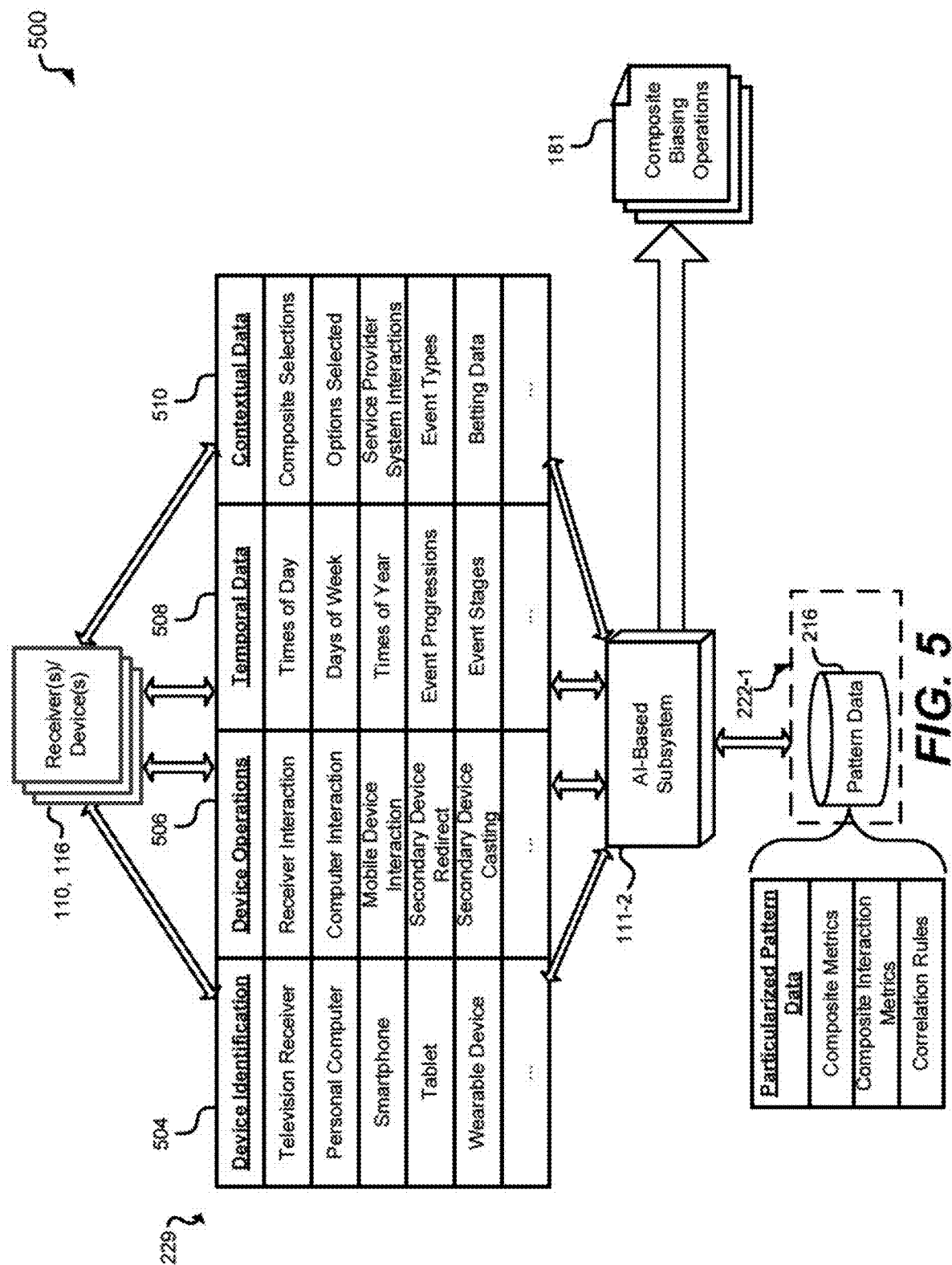
FIG. 5 illustrates certain aspects of subsystem data flow, in accordance with disclosed embodiments of the present disclosure.

FIG. 5 illustrates certain aspects of the AI-based subsystem data flow 500, in accordance with various embodiments of the present disclosure. The content processing subsystem 111 may be configured to gather observation data 229, which may be specific to one or more particular identified users and/or may be generally related to particular receivers/devices 110, 116. The observation data 229 may be gathered from one or more receivers 110 and/or devices 116, aggregated, consolidated, and transformed into viewer pattern profiles that include personalized pattern data 216.

In embodiments where the learning engine 239 is included in a receiver/device 110, 116, the receiver/device 110, 116 may be a self-observer that may additionally gather additional observation data 229. In various embodiments, the data from the one or more receivers/devices 110, 116 may be retrieved and/or received by the content processing subsystem 111 via one or more data acquisition interfaces, which may include interfaces of the content processing subsystem 111, the one or more receivers/devices 110, 116, and/or the like—through network(s) 120 in various embodiments, through any suitable means for direct communication, and/or through any other suitable means of transferring data. According to various embodiments where the subsystem 111 is included in a service provider system 102, observation data 229 may be actively gathered and/or pulled from the one or more receivers/devices 110, 116.

As disclosed herein, in various embodiments, the one or more data acquisition interfaces may include one or more APIs that define protocols and routines for interfacing with the one or more receivers/devices 110, 116 and which may specify API calls to/from one or more receivers/devices 110, 116. In various embodiments, the APIs may include a plug-in to integrate with an application of one or more receivers/devices 110, 116. The API translation profiles may translate the protocols and routines of the data source component and/or system to integrate at least temporarily with the system and allow one-way communication to the system 102 and/or two-way communication with system 102 in various embodiments by way of API calls.

Some embodiments of the subsystem 111 may aggregate observation data 229 to derive device identification data 504, device operations 506, temporal data 508, and/or contextual data 510. The device identification data 504 may include any suitable data for identifying and tracking particular receivers 110 and devices 116; associated accounts, subscribers, and viewers; and/or the like disclosed herein. The device operations data 506 may include any suitable data for identifying and tracking device operations and interactions as those disclosed herein. The contextual data 510 may include metrics and patterns of viewer interactions/responses pursuant to provisioning of content composites 180 and service provider system 103 biasing 181. For example, viewer responses to content composites 180 provisioning may include indications of whether the viewer selected a user-selectable options provided with composites 180, the types of such selections, and/or types of consequent interactions with service provider systems 103. For example, the metrics and patterns may take into account whether the viewer opted out of content composites 180, whether the viewer selected links of composites 180 to interact with the platforms and sites of one or more service provider systems 103, whether the viewer selected options to redirect content composites 180 and/or notifications from service provider systems 103 to a secondary device 116, which service provider systems 103 the viewer selected, whether the viewer placed bets and the types of the viewer's bets and other interactions with service provider systems 103, which types of events and outcomes the viewer placed bets on, amounts wagered, and/or the like. The temporal data 508 may include metrics such as any information to facilitate detection, recognition, and differentiation of one or combination of temporal factors correlated or which the content processing subsystem 111 correlates to other observation data 229 such as device identification data 504, contextual data 510, and/or the like. For example, the temporal data 508 may include time of day information, time of week information, time of year information, holiday information, etc. when the viewer made selections and bets; when during the progression of the events, sports seasons, postseasons, championships, and/or similar stages that the viewer made selections and placed bets; and/or the like.

The learning engine 239 may map one or a combination of various extra-composite metrics of the observation data 229 to the metrics of the particular composites 180 provided to a particular viewer. Based at least in part on taking into account such observation data 229 as part of a feedback loop, the learning engine 239 may employ an ongoing learning mode to develop personalized pattern data 216 for particular viewers or content receivers/devices generally, and to confirm, correct, and/or refine determinations made for personalized pattern data 216 for particular viewers or content receivers/devices generally. The content processing subsystem 111 may be configured to employ machine learning to process the observation data 229 and the content objects 180 and to derive and develop the personalized pattern data 216. The content processing subsystem 111 may be configured to employ deep learning to process the observation data 229 and the content objects 180 and to derive and develop the personalized pattern data 216. The learning engine 239 may be configured to perform any one or combination of features directed to matching or otherwise correlating the observation data 229—such as the device identification data 504, the device operation identification data 506, the temporal data 508, the contextual data 510, descriptive information of the content objects 180, and/or the like—with intra-content metrics of the content objects 180. The learning engine 239 may include logic to implement and/or otherwise facilitate any taxonomy, classification, categorization, correlation, mapping, qualification, scoring, organization, and/or the like features disclosed herein. In some embodiments, the learning engine 239 may include the matching engine 238.

The learning engine 239 may include a reasoning module to make logical inferences from a set of the detected and differentiated data to infer one or more patterns of activity for particular viewers and/or receivers/devices generally. A pattern-based reasoner could be employed to use various statistical techniques in analyzing the data in order to infer personalized pattern data 216 from the observation data 229. A transitive reasoner may be employed to infer relationships from a set of relationships related to the observation data 229. In various embodiments, the system automatically establishes and develops the personalized pattern data 216. However, the personalized pattern data 216 may be set up and/or tailored by users. With various embodiments, the personalized pattern data 216 may be automatically established and developed by the system.

The feedback could be used for training the system to heuristically adapt conclusions, profiles, correlations, attributes, triggers, patterns, and/or the like to learn particular viewers and adapt content composite 180 provisioning to particular viewers, which may include requesting, searching for, and/or selecting particular types of adaptable content items 176 and/or content objects 177 (e.g., which may be based at least in part on the metadata features disclosed herein) for content composite 180 creation. For example, the learning engine 239 may learn that a particular viewer tends to interact with content composites 180 that are directed to only certain types of events. Such event type differentiation may be on the macro level, such as recognizing that a viewer tends to interact more with composites 180 directed to certain types of sports and not other types of sports. Accordingly, the subsystem 111 may bias content composites 180 provisioning toward the types of sports that tend to elicit viewer interaction, and decrease composite 180 provisioning frequency or cease provisioning for other types.

Further, the learning engine 239 may learn that a particular viewer tends to interact with content composites 180 that are directed to only types of events within a particular category (e.g., more high-profile events such as post-season events and/or championship events as opposed to regular season and/or non-championship events). Accordingly, the subsystem 111 may likewise bias content composites 180 provisioning toward such types of events and decrease or cease provisioning with respect to other types. Further, viewer interaction differentiation may be on the micro level, such as recognizing that a viewer tends to interact more with composites 180 directed to certain types of outcomes and state changes with respect to particular events. For example, the learning engine 239 may detect a viewer pattern of interacting only with composites 180 directed to the potential final outcomes/results of an event (e.g., final score, winner, etc.) or may detect a viewer pattern of interacting with more micro-level potential outcomes that can occur within an event (e.g., scoring on particular drives, takedowns, files, per-competitor performance, etc.). Accordingly, the subsystem 111 may likewise bias content composites 180 provisioning toward such types of outcomes and decrease or cease provisioning with respect to other types. Thus, the subsystem 111 may adapt composite 180 provisioning to maximize viewer engagement, and, when the subsystem 111 detects state changes in televised events that are mapped to viewer patterns of composite 180 interaction corresponding to such state changes and events, the subsystem 111 may initiate the polling of one or more corresponding adaptable content items 176, the polling of one or more corresponding content objects 177, and/or the creation of one or more corresponding composites 180 as a function of the detected state change and the detected viewer pattern in order to provide tailored composites 180 to a viewer in response to the detected state change.

Further, in situations where a pattern of more micro-level interactions detected for particular viewer, the subsystem 111 biasing 181 of composites 180 may include serial provisioning of composites 180 in a serial drill-down manner such that the first composites 180 provisioned may be directed to a more macro-level outcome and one or more composites 180 subsequently provisioned may be directed to more micro-level outcomes in accordance with the detected pattern. Thus, disclosed embodiments may provide for serial matching of composites 180 with respect to one another in order to provision the composites 180 with a trend that matches the detected pattern.

As part of such learning and adaptation processes, the subsystem 111 may bias composite 180 provisioning toward use of content objects 177 from certain service provider systems 103 over other service provider systems 103. The learning engine 239 may perform correlation based at least in part on correlation rules that govern correlation of the personalized pattern data 216 to content objects 177 and corresponding sources of the content objects 177 based at least in part on metrics and availabilities of the content objects 177 from the particular source systems 103. In various embodiments, the correlation may be based at least in part on the profiles of the service provider systems 103.

In analyzing content objects 177 received for particular service provider systems 103, the subsystem 111 may identify patterns of types of content objects 177 and mapped which types of content objects 177 are provided by which service provider systems 103. Based at least in part on such mapping, the subsystem 111 may prioritize use of content objects 177 from particular service provider systems 103 where the content objects 177 are of viewers directed to the types of interactions that match interaction patterns of a particular viewer.

Further, such biasing 181 of content objects 177 from one or more systems 103 may include prioritizing attempts to pull content objects 177 from one or more systems 103 based at least in part on speed and responsiveness of systems 103. The subsystem 111 may aggregate and develop service provider system metrics based at least in part on the speed and responsiveness of systems 103 demonstrated with previous attempts to pull one or more content objects 177 within one or more historical time windows (e.g., previous day, five days, week, month, year, etc.). The service provider systems 103 may be scored based at least in part on the metrics, and an individual scores may be utilized in identifying preferential biasing 181 an attempt to pull content objects 177 from respective systems 103. For example, the subsystem 111 may attempt to pull one or more content objects 177 from a first set of one or more service provider systems 103 that has the highest score based on previous performance with respect to speed, timeliness, and a matching content objects 177. In the case that no matching content objects 177 are successfully pulled from the first set of one or more service provider system 103 within a time threshold after the initial request, then the subsystem 111 may pull one or more content objects 177 from a second set of one or more service provider systems 103 that have lower scores. Such serial stages attempt to pull content objects 177 may be continued with additional sets of lower scored systems 103. The time thresholds may be different for each stage (e.g., decreasing or increasing in time) and the size of the selected sets of service provider systems 103 may be different for each stage (e.g., decreasing or increasing in size). In cases where multiple such stages are necessary, the subsystem 111 may subsequently adjust metrics for the systems 103, taking into account the performance demonstrated with such stages of attempt to pull objects 177.

Additionally or alternatively, the subsystem 111 may qualitatively analyze the odds information provided by individual systems 103 with content objects 177. For example, the subsystem 111 may compare the odds information provided with bookmaker/sportsbook ranking data sources 112, actual outcomes corresponding to the odds that are gathered from data sources 112 and/or protected from the television programming content by the subsystem 111, and/or crawl or otherwise pull information from data sources 112 that assesses the accuracy of odds information provided by particular bookmakers/sportsbooks. The subsystem 111 may then adjust service provider system metrics based at least in part on accuracy of odds information provided by the systems 103. Accordingly, the service provider systems 103 may be scored based at least in part on the metrics that are a function of the accuracy of the information provided with content objects 177. Thus, the biasing 181 of content objects 177 from one or more systems 103 may include prioritizing attempts to pull content objects 177 from one or more systems 103 based at least in part on the quality of the content objects 177.

Figure 6:
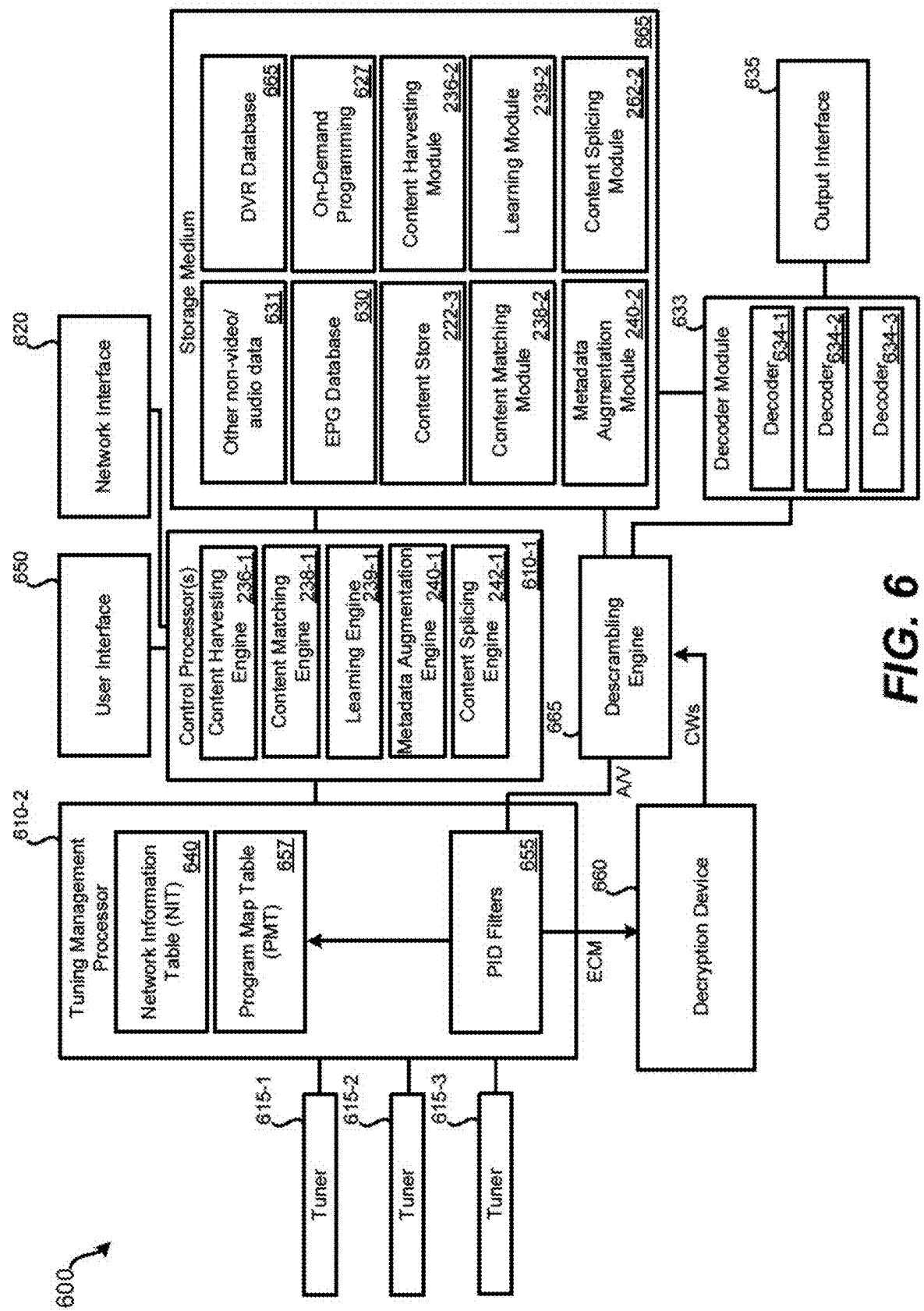
FIG. 6 illustrates a receiver that makes use of, interacts with, and/or at least partially includes the content splicing system, in accordance with disclosed embodiments of the present disclosure.

FIG. 6 illustrates a receiver 600 that makes use of, interacts with, and/or at least partially includes the content splicing system 200, in accordance with disclosed embodiments of the present disclosure. Certain embodiments of the receiver 600 may include set top boxes (STBs), television receivers, and over-the-top receivers. In some embodiments, the receiver 600 may correspond to the television receiver 110. In various embodiments, in addition to being in the form of a STB, a receiver may be incorporated as part of another device, such as a television or other form of display device, such as a computer, smartphone, tablet, or other handheld portable electronic device. For example, a television may have an integrated receiver (which does not involve an external STB being coupled with the television). One or a combination of the content harvesting engine 236-1, the content matching engine 238-1, learning engine 239-1, content augmentation engine 240-1, and/or content splicing engine 242-1 may be provided in conjunction with content harvesting module 236-2, the content matching module 238-2, content augmentation module 240-2, and/or content splicing module 242-2 to implement various functionalities of the content splicing subsystem 111 into the receiver 600.

The receiver 600 may represent receiver 110 of FIG. 1 and may be in the form of a STB that communicates with a display device such as a television. The receiver 600 may be incorporated as part of a television, such as the display device 160 of FIG. 1 or television 600 of FIG. 6, etc. The receiver 600 may include: processors 610 (which may include control processor 610-1, tuning management processor 610-2, and possibly additional processors), tuners 615, network interface 620, non-transitory computer-readable storage medium 625, electronic programming guide (EPG) database 630, networking information table (NIT) 640, digital video recorder (DVR) database 645, on-demand programming 627, content store 222-3, user interface 650, decryption device 660, decoder module 633, interface 635, and/or descrambling engine 665. In other embodiments of receiver 600, fewer or greater numbers of components may be present. It should be understood that the various components of receiver 600 may be implemented using hardware, firmware, software, and/or some combination thereof. Functionality of components may be combined; for example, functions of descrambling engine 665 may be performed by tuning management processor 610-2. Further, functionality of components may be spread among additional components; for example, PID filters 655 may be handled by separate hardware from program map table 657. The receiver 600 may be in data communication with service providers, such as by way of network interface 620.

The processors 610 may include those configured to perform processes such as tuning to a particular channel, accessing and displaying EPG information from the EPG database 630, and/or receiving and processing input from a user. For example, the processors 610 may include one or more processors dedicated to decoding video signals from a particular format, such as MPEG, for output and display on a television and for performing decryption, if required. It should be understood that the functions performed by various modules of FIG. 6 may be performed using one or more processors. As such, for example, functions of the descrambling engine 665 may be performed by the control processor 610-1.

The control processor 610-1 may communicate with tuning management processor 610-2. The control processor 610-1 may control the recording of television channels based at least in part on timers stored in the DVR database 645. The control processor 610-1 may also provide commands to the tuning management processor 610-2 when recording of a television channel is to cease. In addition to providing commands relating to the recording of television channels, the control processor 610-1 may provide commands to the tuning management processor 610-2 that indicate television channels to be output to the decoder module 633 for output to a display device. The control processor 610-1 may also communicate with the network interface 620 and the user interface 650. The control processor 610-1 may handle incoming data from network interface 620, including network transport streams received from over-the-top service providers. The control processor 610-1 may handle incoming data from the network interface 620, including network transport streams received from the user interface 650, which may include user input received by way of one or more human interface devices. Additionally, the control processor 610-1 may be configured to output data via the network interface 620. The control processor 610 may also be configured to perform image and audio analysis, such as to identify contextual aspects present in an audio or video stream, for example facial recognition or voice recognition.

The tuners 615 may include one or more tuners used to tune to transponders that include broadcasts of one or more television channels that may be received from a satellite or cable system, for example. In the illustrated embodiment of receiver 600, three tuners are present (tuner 615-1, tuner 615-2, and tuner 615-3). In other embodiments, two or more than three tuners may be present, such as four, six, or eight tuners. Each tuner contained in the tuners 615 may be capable of receiving and processing a single transponder stream from a satellite transponder at a given time, for example. As such, a single tuner may tune to a single transponder stream at a given time. If the tuners 615 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of the tuners 615 may be used to receive the signal containing the multiple television channels for presentation and/or recording. The tuners 615 may receive commands from the tuning management processor 610-2. Such commands may instruct the tuners 615 which frequencies are to be used for tuning.

The network interface 620 may be used to communicate via an alternate communication channel with a television service provider, if such communication channel is available. The primary communication channel may be via satellite (which may be unidirectional to the receiver 600) and the alternate communication channel (which may be bidirectional) may be via a network, such as the Internet. Referring back to FIG. 1, receiver 110 may be able to communicate with television service provider system 102 via a network 120, such as the Internet. This communication may be bidirectional: data may be transmitted from the receiver 110 to the television service provider system 102 and from the television service provider system 102 to the receiver 110. Referring back to FIG. 6, the network interface 620 may be configured to communicate via one or more networks, such as the Internet, to communicate with television service provider system 102 of FIG. 1. Other information may be transmitted and/or received via the network interface 620 such as adaptable content items 176, content objects 177, metadata, and/or the like as disclosed herein.

The storage medium 625 may represent one or more non-transitory computer-readable storage mediums. The storage medium 625 may include memory and/or a hard drive. The storage medium 625 may be used to store information received from one or more satellites and/or information received via the network interface 620. The storage medium 625 may store information related to the EPG database 630, augmentation module 632 and related preferences, other non-video/audio data 631, DVR database 645, commercial database 646, and/or on-demand programming 627. Recorded television programs may be stored using the storage medium 625 as part of the DVR database 645. The storage medium 625 may be partitioned or otherwise divided (such as into folders) such that predefined amounts of the storage medium 625 are devoted to storage of television programs recorded due to user-defined timers and stored television programs recorded due to provider-defined timers.

The EPG database 630 may store information related to television channels and the timing of programs appearing on such television channels. The EPG database 630 may be stored using the storage medium 625, which may be a hard drive. Information from the EPG database 630 may be used to inform users of what television channels or programs are popular and/or provide recommendations to the user. Information from the EPG database 630 may provide the user with a visual interface displayed by a television that allows a user to browse and select television channels and/or television programs for viewing and/or recording. Information used to populate the EPG database 630 may be received via the network interface 620 and/or via satellites, such as the satellite 106 of FIG. 1 via the tuners 615. For instance, updates to the EPG database 630 may be received periodically via satellite. The EPG database 630 may serve as an interface for a user to control DVR functions of the receiver 600, and/or to enable viewing and/or recording of multiple television channels simultaneously. Information from EPG database 630 may be output as a video stream to a display device. A particular user may issue commands indicating that an EPG interface be presented. A user issuing a command that an EPG be displayed may constitute a change command. In some embodiments, content composites 180 may be created and presented in conjunction with the EPG. For example, content composites 180 could pertain to televised events indicated in the EPG. Hence, content composite 180 features may extend to EPG views in some embodiments.

The network information table (NIT) 640 may store information used by the receiver 600 to access various television channels. The NIT 640 may be stored locally by a processor, such as the tuning management processor 610-2 and/or by the storage medium 625. Information used to populate the NIT 640 may be received via satellite (or cable) through the tuners 615, may be received via the network interface 620, such as from the television service provider. As such, information present in the NIT 640 may be periodically updated. In some embodiments, NIT 640 may be locally-stored by the receiver 600 using the storage medium 625. Generally, the NIT 640 may store information about a service provider network, such as a satellite-based service provider network. Information that may be present in the NIT 640 may include: television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or subchannel identifiers for various television channels. In some embodiments, the NIT 640 may contain additional data or additional tables may be stored by the receiver. For example, while specific audio PIDs and video PIDs may not be present in the NIT 640, a channel identifier may be present within the NIT 640 which may be used to look up the audio PIDs and video PIDs in another table, such as a program map table (PMT). In some embodiments, a PID associated with the data for the PMT is indicated in a separate table, program association table (PAT), which is not illustrated in FIG. 6. A PAT may be stored by the receiver in a similar manner to the NIT. For example, a PMT may store information on audio PIDs, and/or video PIDs. A PMT stores data on ECM (entitlement control message) PIDs for television channels that are transmitted on a transponder stream, transport stream, or digital broadcast. If, for a first television channel, multiple television channels are to be tuned to, the NIT 640 and/or the PMT 657 may indicate a second television channel that is to be tuned to when a first channel is tuned to; this may allow for switching to output of the second television channel for different commercials, for example.

A table, such as the NIT, PAT, or PMT may store indications of PIDs that are related to supplemental audio content for individual channels or other forms of content. For instance, each television channel may be associated with a different supplemental audio PID. If supplemental audio content is to be transmitted for a given television channel, packets containing the supplemental audio are transmitted to the receiver having its associated supplemental audio content PID. This PID could be distinct from any of the audio programs of the television programming (e.g., the first audio program, second audio program (SAP), actual descriptive audio). In some embodiments, supplemental audio content is transmitted using the same transponder stream as the television channel or content to which the supplemental audio content corresponds. In some embodiments, a single supplemental audio PID is used to identify supplemental audio for multiple television channels, such as all the television channels on a given transponder. A second identifier present within the supplemental audio data may be used to distinguish for which television channel the supplemental audio data corresponds.

Based at least in part on information in the NIT, it may be possible to determine the proper satellite and transponder to which to tune for a particular television channel, or to determine the proper antenna and frequency to which to tune to for a particular television channel. In some embodiments, the NIT may list a particular frequency to which to tune for a particular television channel. Once tuned to the proper satellite/transponder/antenna/frequency, the PMT PID may be used to retrieve a program map table that indicates the PIDs for audio and video streams of television channels transmitted by that transponder.

While a large portion of storage space of the storage medium 625 may be devoted to storage of television programming, a portion may be devoted to storage of non-audio/video data, such as the EPG database 630 and other non-video/audio data 631. This "other" data may permit the receiver 600 to function properly. In some embodiments, at least ten gigabytes are allocated to such other data. For example, if the NIT 640 is stored by the storage medium 625, it may be part of the other non-video/audio data 631.

The decoder module 633 may serve to convert encoded video and audio into a format suitable for output to a display device. For instance, the decoder module 633 may receive MPEG video and audio from the storage medium 625, the network interface 620, or the descrambling engine 665 to be output to a television. MPEG video and audio from the storage medium 625 may have been recorded to the DVR database 645 as part of a previously-recorded television program. The decoder module 633 may convert the MPEG video and audio into a format appropriate to be displayed by a television or other form of display device and audio into a format appropriate to be output from speakers, respectively. The decoder module 633 may have the ability to convert a finite number of television channel streams received from the storage medium 625, the network interface 620, or the descrambling engine 665 simultaneously. For instance, each of the decoders 634 within the decoder module 633 may be able to only decode a single television channel at a time.

While a television channel is being decoded by a decoder of the decoders 634, the television channel is not necessarily output to a display device via the television interface 635. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of the decoder module 633 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames may be properly decoded. The output of the decoder, which is provided to the television interface 635, may be controlled by the control processor 610-1, or some other processor. While the decoder module 633 is illustrated as having three decoders 634 (decoder 634-1, decoder 634-2, and decoder 634-3), in other embodiments, a greater or fewer number of decoders may be present in the receiver 600.

The television interface 635 may serve to output a signal to a television (or another form of display device) in a proper format for display of video and playback of audio. As such, the television interface 635 may output one or more television channels, stored television programming from the storage medium 625 (e.g., television programs from the DVR database 645, television programs from on-demand programming 627 and/or information from the EPG database 630) to a television for presentation.

Digital Video Recorder (DVR) functionality may permit a television channel to be recorded for a period of time. DVR functionality of the receiver 600 may be managed by the control processor 610-1. The control processor 610-1 may coordinate the television channel, start time, and stop time of when recording of a television channel is to occur. In various embodiments, adaptable content items 176 could be selected and inserted into the presentation stream prior to recording, during recording, and/or upon playback of the recording. The DVR database 645 may store information related to the recording of television channels. The DVR database 645 may store timers that are used by the control processor 610-1 to determine when a television channel should be tuned to and its programs recorded to the DVR database 645 of storage medium 625. In some embodiments, a limited amount of the storage medium 625 may be devoted to the DVR database 645. Timers may be set by the television service provider and/or one or more users of the receiver 600.

User profiles may also be stored in the storage medium 645 and may include stored user preferences that may be inferred by the television receiver 600 based at least in part on viewing history. The television receiver 600 may communicate user profile information to the service system(s) 102, 103 to request adaptable content items 176 and content objects 177 tailored to the inferred user preferences to provision composites 180 in accordance with certain embodiments disclosed herein. The user profiles may include profiles for multiple users or may include a single profile for the television receiver in general. In some embodiments, the user profiles may include preferences for customized content presentation adjustments disclosed herein. The preferences could include customized viewing interests, such as programming content, advertising content, product content, and/or the like that corresponds to augmented content selections relating to recognized actors and/or products. The user profiles may further include user feedback, via user-selectable options, received from the user regarding customizations. The feedback data may be used to refine the customizations for particular viewers and types of content customizations.

The on-demand programming 627 may represent additional television programming stored by the storage medium 625. The on-demand programming 627 may include television programming that was not recorded to the storage medium 625 via a timer (either user- or provider-defined). Rather, on-demand programming is programming provided to the receiver directly for storage by the receiver and for later presentation to one or more users. In various embodiments, adaptable content items 176 could be selected and inserted into the presentation stream prior to or upon playback of the recording.

The user interface 650 may include a remote control (physically separate from the receiver 600) and/or one or more buttons on the receiver 600 that allow a user to interact with the receiver 600. The user interface 650 may be used to select a television channel for viewing, view information from the EPG database 630, and/or program a timer stored to DVR database 645, wherein the timer is used to control the DVR functionality of the control processor 610-1. The user interface 650 may also be used to transmit commands to the receiver 600 and make user selections to customize user preferences.

Referring back to the tuners 615, television channels received via satellite (or cable) may contain at least some scrambled data. Packets of audio and video may be scrambled to prevent unauthorized users (e.g., nonsubscribers) from receiving television programming without paying the television service provider. When a tuner of the tuners 615 is receiving data from a particular transponder of a satellite, the transponder stream may be a series of data packets corresponding to multiple television channels. Each data packet may contain a packet identifier (PID), which, in combination with the NIT 640 and/or the PMT 657, may be determined to be associated with a particular television channel. Particular data packets, referred to as entitlement control messages (ECMs), may be periodically transmitted. ECMs may be associated with another PID and may be encrypted; the receiver 600 may use the decryption device 660 to decrypt ECMs. Decryption of an ECM may only be possible if the user has authorization to access the particular television channel associated with the ECM. When an ECM is determined to correspond to a television channel being stored and/or displayed, the ECM may be provided to the decryption device 660 for decryption.

The decryption device 660 may be a removable or non-removable smart card. When the decryption device 660 receives an encrypted ECM, the decryption device 660 may decrypt the ECM to obtain some number of control words. In some embodiments, from each ECM received by the decryption device 660, two control words are obtained. In some embodiments, when the decryption device 660 receives an ECM, it compares the ECM to the previously received ECM. If the two ECMs match, the second ECM is not decrypted because the same control words would be obtained. In other embodiments, each ECM received by the decryption device 660 is decrypted; however, if a second ECM matches a first ECM, the outputted control words will match; thus, effectively, the second ECM does not affect the control words output by the decryption device 660. The decryption device 660 may be permanently part of the receiver 600 or may be configured to be inserted and removed from the receiver 600. In some embodiments, the control processor 610-1, the tuning management processor 610-2, or other hardware may be able to determine that a received ECM has not changed from the previous iteration, and therefore not provide the repeated ECM to the smart card, since the same control word(s) will be obtained.

The tuning management processor 610-2 may be in communication with the tuners 615 and the control processor 610-1. The tuning management processor 610-2 may be configured to receive commands from the control processor 610-1. Such commands may indicate when to start/stop recording a television channel and/or when to start/stop causing a television channel to be output to a television. The tuning management processor 610-2 may control the tuners 615. From the tuners 615, the tuning management processor 610-2 may receive transponder streams of packetized data. From the network interface 620, the tuning management processor 610-2 may receive network transport stream of packetized data. As previously detailed, some or all of these packets may include a PID that identifies the content of the packet.

The tuning management processor 610-2 may be configured to create one or more PID filters 655 that sort packets received from the tuners 615 and/or the network interface 620 based at least in part on the PIDs. When a tuner is initially tuned to a particular frequency (e.g., to a particular transponder of a satellite), a PID filter may be created based at least in part on the PMT data. The PID created, based at least in part on the PMT data packets, may be known because it is stored as part of the NIT 640 or another table, such as a program association table (PAT). From the PMT data packets, PMT may be constructed by the tuning management processor 610-2.

The PID filters 655 may be configured to filter data packets based at least in part on PIDs. In some embodiments, the PID filters 655 are created and executed by the tuning management processor 610-2. For each television channel to be output for presentation or recorded, a separate PID filter may be configured. In other embodiments, separate hardware may be used to create and execute such PID filters. Depending on a television channel selected for recording/viewing, a PID filter may be created to filter: (1) the video packets associated with the television channel; (2) the audio packets associated with the television channel; and (3), if enabled, supplemental audio content for use in conjunction with interactive content. The PMT 657 may store the particular assignments of PIDs for individual television channels. For example, if a transponder data stream includes multiple television channels, data packets corresponding to a television channel that is not desired to be stored or displayed by the user may be ignored by the PID filters 655 and not routed to the descrambling engine 665, the decryption device 660, or the control processor 610-1. As such, only data packets corresponding to the one or more television channels desired to be stored and/or displayed may be filtered and passed to either the descrambling engine 665 or the decryption device 660; other data packets may be ignored. For each television channel, a stream of video packets, a stream of audio packets (one or both of the audio programs), a stream of supplemental audio content, and/or a stream of ECM packets may be present, each stream identified by a PID. In some embodiments, a common ECM stream may be used for multiple television channels. Additional data packets corresponding to other information, such as updates to the NIT 640, may be appropriately routed by the PID filters 655. At a given time, one or multiple PID filters may be executed by the tuning management processor 610-2.

The descrambling engine 665 may use the control words output by the decryption device 660 in order to descramble video and/or audio corresponding to television channels for storage and/or presentation. Video and/or audio data contained in the transponder data stream received by the tuners 615 may be scrambled. Video and/or audio data may be descrambled by the descrambling engine 665 using a particular control word. Which control word output by the decryption device 660 to be used for successful descrambling may be indicated by a scramble control identifier present within the data packet containing the scrambled video or audio. Descrambled video and/or audio may be output by the descrambling engine 665 to the storage medium 625 for storage (in the DVR database 645) and/or to the decoder module 633 for output to a television or other presentation equipment via the television interface 635.

For simplicity, the receiver 600 of FIG. 6 has been reduced to a block diagram; commonly known parts, such as a power supply, have been omitted. Further, some routing between the various modules of the receiver 600 has been illustrated. Such illustrations are for exemplary purposes only. The state of two modules not being directly or indirectly connected does not indicate the modules cannot communicate. Rather, connections between modules of the receiver 600 are intended only to indicate possible common data routing. It should be understood that the modules of the receiver 600 may be combined into a fewer number of modules or divided into a greater number of modules.

Further, the components of the television receiver 600 may be part of another device, such as built into a television. The television receiver 600 may include one or more instances of various computerized components, such as disclosed in relation to computer systems disclosed further herein. While the television receiver 600 has been illustrated as a satellite receiver, it is to be appreciated that techniques below may be implemented in other types of television receiving devices, such as cable receivers, terrestrial receivers, IPTV receivers or the like. In some embodiments, the television receiver 600 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 7:
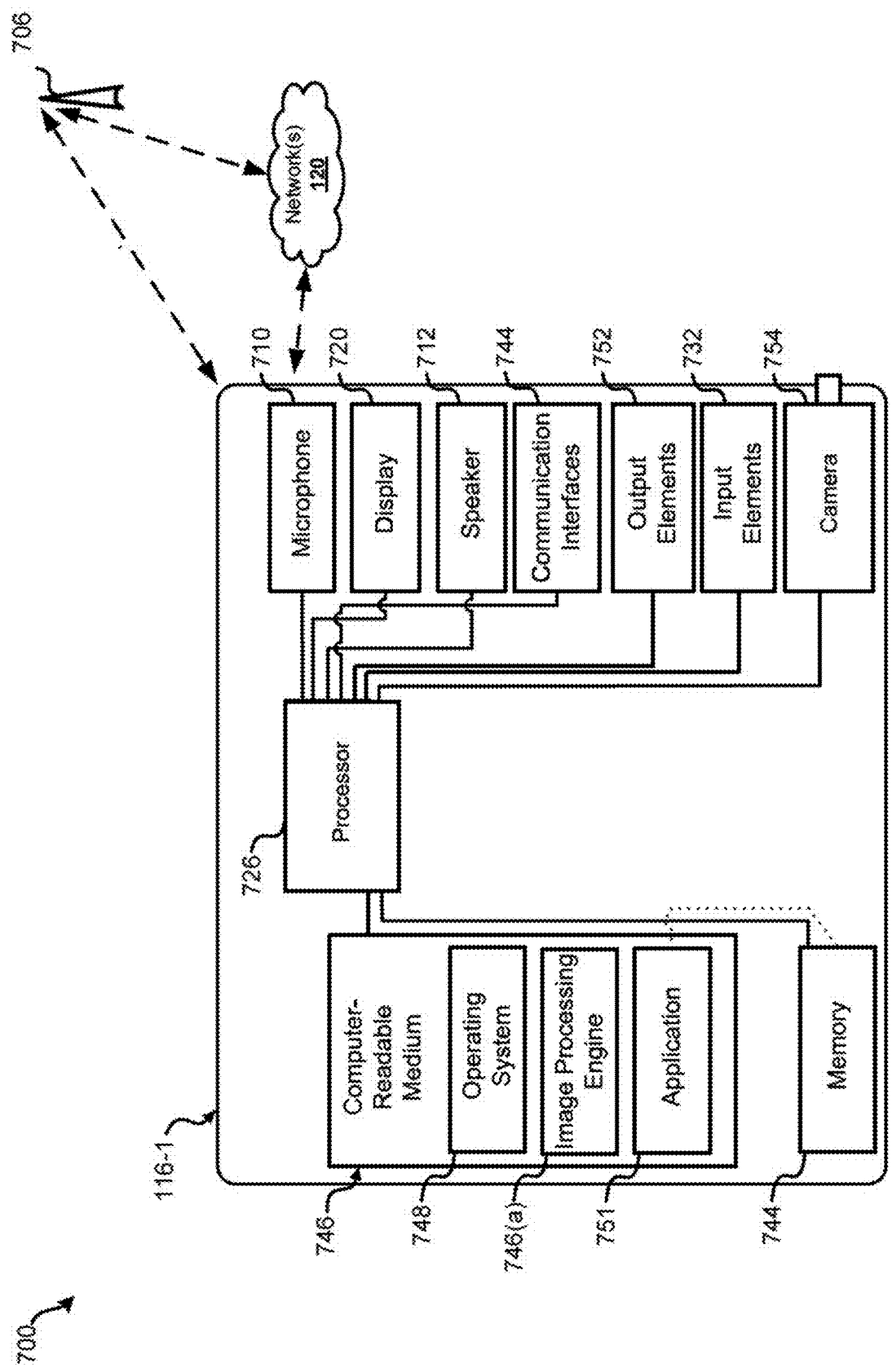
FIG. 7 illustrates a system including one non-limiting example of a computing device configured to facilitate adaptive content splicing, in accordance with disclosed embodiments of the present disclosure.

FIG. 7 is a block diagram of a system 700 including one non-limiting example of a computing device 116 configured to facilitate adaptive content splicing, in accordance with disclosed embodiments of the present disclosure. The computing device 116 may be a portable device suitable for sending and receiving information to/from the receiver 110 and over a network to/from remote data sources (e.g., service providers 103 and online content sources 112) in accordance with embodiments described herein. For example, in various embodiments, the computing device 116 may correspond to one or more of computing devices 116a, 106b, 116c, 116d depicted in FIG. 1.

In some embodiments, the computing device 116 may be provided with an application 751, which may, in some embodiments, correspond to a mobile application configured to run on the computing device 116 to facilitate various embodiments of this disclosure. For example without limitation, the mobile application 751 may transform the computing device 116 into an adaptive content splicing device to facilitate features of various embodiments disclosed herein. In various embodiments, the mobile application 751 may allow the device 116 to be configured to provide one or a combination of the content harvesting engine 236-1, the content matching engine 238-1, learning engine 239-1, content augmentation engine 240-1, and/or content splicing engine 242-1 may be provided in conjunction with the content harvesting module 236-2, the content matching module 238-2, content augmentation module 240-2, and/or content splicing module 242-2 to implement various functionalities of the content splicing subsystem 111 into the device 116.

In various embodiments, the application 751 can be any suitable computer program that can be installed and run on the computing device 116, and, in some embodiments, the application 751 may not be a mobile app but may be another type of application, set of applications, and/or other executable code configured to facilitate embodiments disclosed herein. The application 751 may be provided in any suitable way. For non-limiting example, the application 751 may be made available from a website, an application store, the service provider 102, etc. for download to the computing device 116; alternatively, it may be pre-installed on the computing device 116.

In various embodiments, the computing device 116 configured with the application 751 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 7, the computing device 116 includes a display 720 and input elements 732 to allow a user to input information into the computing device 116. By way of example without limitation, the input elements 732 may include one or more of a keypad, a trackball, a touchscreen, a touchpad, a pointing device, a microphone, a voice recognition device, or any other appropriate mechanism for the user to provide input.

In various embodiments, the computing device 116 may pull content items 176, content objects 177, and/or composites 180 from the receiver 110 and/or from systems 102 and/or 103 via the network 120 in order to provide the content composites 180 to a user of the computing device 116 through the application 751. The application 751 can include a utility that communicates with the receiver 110 and/or from online data sources via the network 120 to control downloading, displaying, caching, and/or other operations concerning the handling of content items 176, content objects 177, and/or composites 180. The application 751 and the computing device 116 may cooperate with the receiver 110 to facilitate tracking of (and customizations of user profiles and other features disclosed herein based at least in part on) user selections in response to content objects displayed through the one or more additional applications.

The user selection of a user-selectable option corresponding to the application 751 may involve any one or combination of various user inputs. The user selection may be in the form of a keyboard/keypad input, a touch pad input, a track ball input, a mouse input, a voice command, etc. For example, the content object may be selected by the user by pointing and clicking on a content object. As another example, a content object may be selected by an appropriate tap or movement applied to a touch screen or pad of the computing device 116.

The computing device 116 includes a memory 734 communicatively coupled to a processor 736 (e.g., a microprocessor) for processing the functions of the computing device 116. The computing device 116 may include at least one antenna 738 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The computing device 116 may also include a microphone 740 to allow a user to transmit voice communication through the computing device 116, and a speaker 742 to allow the user to hear voice communication. The antenna 738 may include a cellular antenna (e.g., for sending and receiving cellular voice and data communication, such as through a network such as a 3G, 4G, or 5G network). In addition, the computing device 116 may include one or more interfaces in addition to the antenna 738, e.g., a wireless interface coupled to an antenna.

The communications interfaces 744 can provide a near field communication interface (e.g., contactless interface, Bluetooth, optical interface, infrared interface, etc.) and/or wireless communications interfaces capable of communicating through a cellular network, such as GSM, or through Wi-Fi, such as with a wireless local area network (WLAN). Accordingly, the computing device 116 may be capable of transmitting and receiving information wirelessly through both short range, radio frequency (RF), cellular, and Wi-Fi connections. The computing device 116 may access the network 108 through a wireless link to an access point. For example, a computing device 116 may access the network 108 through one or more access points 706. The access points 706 may be of any suitable type or types. For example, an access point 706 may be a cellular base station, an access point for wireless local area network (e.g., a Wi-Fi access point), an access point for wireless personal area network (e.g., a Bluetooth access point), etc. The access point 706 may connect the computing device 116 to the network 108, which may include the Internet, an intranet, a local area network, private communication networks, etc. In some embodiments, the communications interfaces 744 may allow computing device 116 to receive programming content cast from the television receiver. For example, the programming content from the television receiver may be indirectly transmitted via a local network (e.g., via Wi-Fi) or directly transmitted to the computing device via a casting device integrated with the television receiver or coupled to the television receiver (e.g., via a dongle). As another example, the television receiver may cast programming content to the computing device via a wired connection (e.g., via one or more of HDMI, USB, lightning connector, etc.). Some embodiments may provide for simulcasting such that the same programming that is being displayed on the display device is being displayed on the computing device 116 simultaneously or substantially simultaneously.

The computing device 116 can also include at least one computer-readable medium 746 coupled to the processor 736, which stores application programs and other computer code instructions for operating the device, such as an operating system (OS) 748. In some embodiments, the application 751 may be stored in the memory 734 and/or computer-readable media 746. Again, the example of computing device 116 is non-limiting. Other devices, such as those disclosed herein, may be used.

The mobile computing device 736 can additionally include an integrated camera 754, capable of capturing images and/or video, and output elements 752. In certain embodiments, the mobile computing device 736 may include a non-transitory computer-readable storage medium, e.g., memory 734, for storing images captured with the camera 754. In alternative embodiments, the mobile computing device 736 receives image data from an image capture device that is not integrated with the mobile computing device 736 (e.g., from the receiver 110 and/or the online content sources 112).

In some embodiments, the computer-readable medium 746 can also include an image-processing engine 746(*a*). The image-processing engine 746(*a*) can perform image processing of images captured by the camera 754 to perform recognition of programming content 202 in accordance with embodiments disclosed herein. The image-processing engine 746(*a*) may analyze the images and generate accessible interface elements using the identified and/or analyzed images. With some embodiments, the image-processing engine 746(*a*) is separate from the application 751. In other embodiments, the application 751 may include the image-processing engine 746(*a*). In some embodiments, the computing device 116 provides the captured images to the receiver 110, and the receiver 110 performs the image processing and analysis. In some embodiments, the computing device 116 provides the captured images to the service provider 102, and the service provider performs the image processing and analysis.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 8:
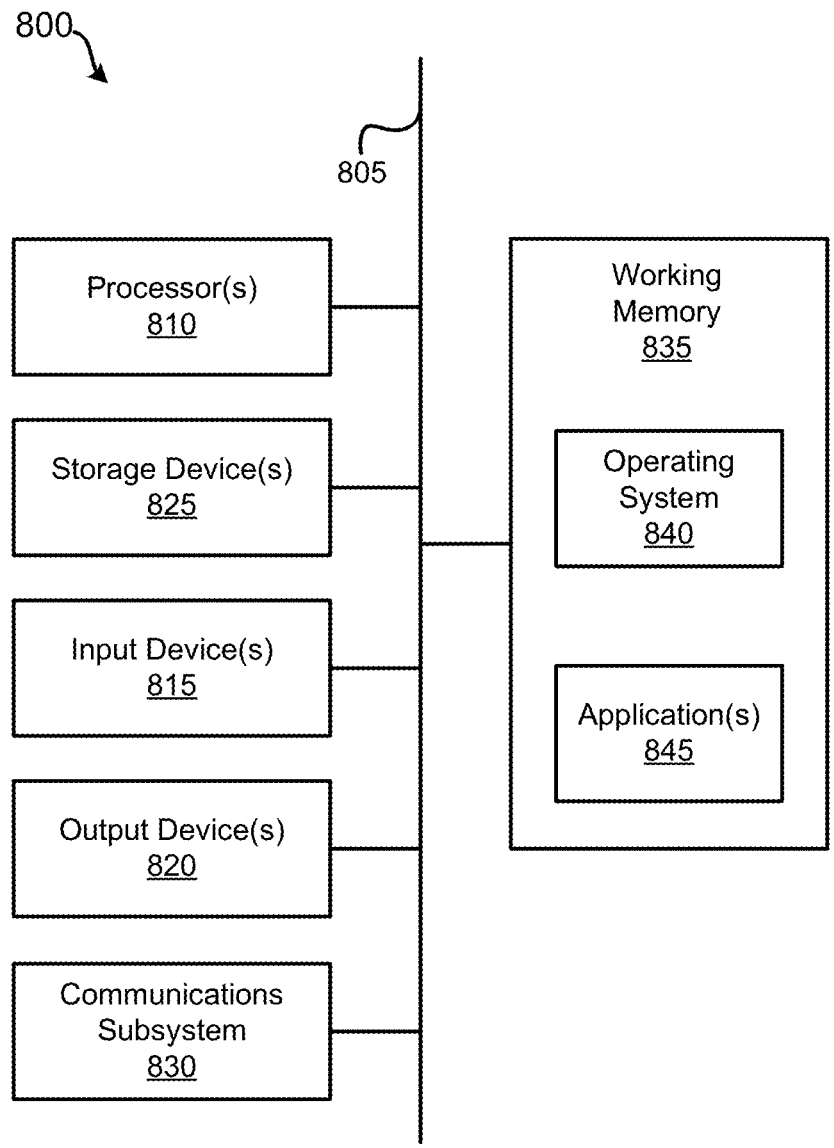
FIG. 8 illustrates a computer system, in accordance with disclosed embodiments of the present disclosure.

A computer system as illustrated in FIG. 8 may be incorporated as part of the previously described computerized devices, such as a television receiver 110, device(s) 116, and/or television service provider system 102. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method comprising:
   identifying programming content that corresponds to an event that is televised;
   detecting one or more indicators of one or more state changes with respect to the event, the one or more state changes comprising a change occurring within the event;
   consequent to the detecting the one or more state changes, creating a content composite for display by a mobile device during an ongoing presentation of the event at least in part by:
   processing an adaptable content item corresponding to content configured for presentation with the mobile device;
   modifying the adaptable content item based at least in part on a content object received via a network to form the content composite so that the content composite:
   is particularized to the event as a function of the one or more state changes; and
   comprises one or more user-selectable options that facilitate one or more operations with respect to the event with the mobile device;
   where the modifying comprises merging at least part of the content object with the adaptable content item; and
   outputting the content composite to facilitate presentation of the one or more user-selectable options with the mobile device during the ongoing presentation of the event, where one or both of the creating and the outputting the content composite are a function of a set of rules mapped to a location of the mobile device and observation data corresponding to one or more types of bets previously placed and/or one or more amounts wagered via the one or more previously presented content composites.

2. The method as recited in claim 1, where the content object is received consequent to the detecting the one or more state changes.

3. The method as recited in claim 1, where the one or more operations correspond to interacting with a remote system that is remote from the mobile device.

4. The method as recited in claim 1, where the event and the one or more user-selectable options are presented on the mobile device.

5. The method as recited in claim 1, where the user-selectable options are presented on the mobile device and the event is not presented on the mobile device.

6. The method as recited in claim 5, where the event is presented on a second device in the location.

7. The method as recited in claim 1, where one or both of the creating and the outputting the content composite are further a function of observation data corresponding to one or both of the mobile device and a user associated with the mobile device and interaction with one or more previously presented content composites.

8. A system comprising:
one or more processing devices; and
memory communicatively coupled with and readable by the one or more processing devices and having stored therein machine-readable instructions which, when executed by the one or more processing devices, cause the one or more processing devices to perform:
identifying programming content that corresponds to an event that is televised;
detecting one or more indicators of one or more state changes with respect to the event, the one or more state changes comprising a change occurring within the event;
consequent to the detecting the one or more state changes, creating a content composite for display by a mobile device during an ongoing presentation of the event at least in part by:
processing an adaptable content item corresponding to content configured for presentation with the mobile device;
modifying the adaptable content item based at least in part on a content object received via a network to form the content composite so that the content composite:
is particularized to the event as a function of the one or more state changes; and
comprises one or more user-selectable options that facilitate one or more operations with respect to the event with the mobile device;
where the modifying comprises merging at least part of the content object with the adaptable content item; and
outputting the content composite to facilitate presentation of the one or more user-selectable options with the mobile device during the ongoing presentation of the event, where one or both of the creating and the outputting the content composite are a function of a set of rules mapped to a location of the mobile device and observation data corresponding to one or more types of bets previously placed and/or one or more amounts wagered via the one or more previously presented content composites.

9. The system as recited in claim 8, where the content object is received consequent to the detecting the one or more state changes.

10. The system as recited in claim 8, where the one or more operations correspond to interacting with a remote system that is remote from the mobile device.

11. The system as recited in claim 8, where the event and the one or more user-selectable options are presented on the mobile device.

12. The system as recited in claim 8, where the user-selectable options are presented on the mobile device and the event is not presented on the mobile device.

13. The system as recited in claim 8, where the one or more processing devices are separate from the mobile device and cause transmission of the content composite to facilitate the presentation of the one or more user-selectable options with the mobile device.

14. The system as recited in claim 8, where the mobile device comprises the one or more processing devices.

15. One or more non-transitory, machine-readable media having machine-readable instructions thereon which, when executed by one or more processing devices, cause the one or more processing devices to perform:
identifying programming content that corresponds to an event that is televised;
detecting one or more indicators of one or more state changes with respect to the event, the one or more state changes comprising a change occurring within the event;
consequent to the detecting the one or more state changes, creating a content composite for display by a mobile device during an ongoing presentation of the event at least in part by:
processing an adaptable content item corresponding to content configured for presentation with the mobile device;
modifying the adaptable content item based at least in part on a content object received via a network to form the content composite so that the content composite:
is particularized to the event as a function of the one or more state changes; and
comprises one or more user-selectable options that facilitate one or more operations with respect to the event with the mobile device;
where the modifying comprises merging at least part of the content object with the adaptable content item; and
outputting the content composite to facilitate presentation of the one or more user-selectable options with the mobile device during the ongoing presentation of the event, where one or both of the creating and the outputting the content composite are a function of a set of rules mapped to a location of the mobile device and observation data corresponding to one or more types of bets previously placed and/or one or more amounts wagered via the one or more previously presented content composites.

16. The one or more non-transitory, machine-readable media as recited in claim 15, where the content object is received consequent to the detecting the one or more state changes.

17. The one or more non-transitory, machine-readable media as recited in claim 15, where the one or more operations correspond to interacting with a remote system that is remote from the mobile device.

18. The one or more non-transitory, machine-readable media as recited in claim 15, where the event and the one or more user-selectable options are presented on the mobile device.

19. The one or more non-transitory, machine-readable media as recited in claim 15, where the user-selectable options are presented on the mobile device and the event is not presented on the mobile device.

20. The one or more non-transitory, machine-readable media as recited in claim 15, where one or both of the creating and the outputting the content composite are further a function of observation data corresponding to one or both of the mobile device and a user associated with the mobile device and interaction with one or more previously presented content composites.

* * * * *